United States Patent
Hattori et al.

(10) Patent No.: US 6,832,131 B2
(45) Date of Patent: Dec. 14, 2004

(54) LEGGED MOBILE ROBOT AND METHOD OF CONTROLLING OPERATION OF THE SAME

(75) Inventors: Yuichi Hattori, Chiba (JP); Tatsuzo Ishida, Tokyo (JP); Jinichi Yamaguchi, Tama Research Institute, 5-14-38, Tamadaira, Hino-Shi, Tokyo (JP)

(73) Assignees: Sony Corporation, Tokyo (JP); Jinichi Yamaguchi, Tokyo (JP)

(*) Notice: Subject to any disclaimer, the term of this patent is extended or adjusted under 35 U.S.C. 154(b) by 76 days.

(21) Appl. No.: 10/261,461

(22) Filed: Sep. 30, 2002

(65) Prior Publication Data

US 2003/0036818 A1 Feb. 20, 2003

Related U.S. Application Data

(63) Continuation of application No. 09/718,629, filed on Nov. 22, 2000, now Pat. No. 6,463,356.

(30) Foreign Application Priority Data

Nov. 24, 1999 (JP) .......................................... 11-332934

(51) Int. Cl.$^7$ .............................................. G06F 19/00
(52) U.S. Cl. ....................... 700/245; 700/247; 700/249; 700/250; 700/252; 700/253; 700/258; 700/260; 700/264; 318/568.1; 318/568.11; 318/568.12; 318/568.15; 318/568.16; 318/568.17; 318/568.22; 318/568.25; 180/8.1; 180/8.6; 901/1; 901/2; 901/9
(58) Field of Search ................................. 700/245, 258, 700/260, 264, 247, 249, 250, 252, 253; 318/568.12, 580, 568.1, 568.11, 568.15, 568.16, 568.17, 568.18, 568.22, 568.25; 473/430, 446, 471, 460; 273/108.52; 701/23, 25; 180/8.1, 8.6; 901/1, 2, 9

(56) References Cited

U.S. PATENT DOCUMENTS

| | | | |
|---|---|---|---|
| 5,357,433 A | * 10/1994 | Takenaka et al. | .............. 701/23 |
| 5,404,086 A | 4/1995 | Takenaka et al. | |
| 5,737,217 A | 4/1998 | Nishikawa et al. | |

(List continued on next page.)

FOREIGN PATENT DOCUMENTS

| | | |
|---|---|---|
| EP | 0 661 614 A2 | 7/1995 |
| EP | 1 103 450 A1 * | 5/2001 |
| EP | 1 103 451 A2 | 5/2001 |
| JP | 6-31658 | 2/1994 |
| JP | 7-205085 | 8/1995 |
| JP | 407222833 A | 8/1995 |
| JP | 9-142347 | 6/1997 |
| JP | 237979 A | 2/1999 |
| WO | PCT/JP99/03089 | 6/1999 |

OTHER PUBLICATIONS

Patent Abstracts of Japan, 2000–061872, publication date, Feb. 29, 2000.

(List continued on next page.)

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

A legged mobile robot possesses degrees of freedom which are provided at roll, pitch, and yaw axes at a trunk. By using these degrees of freedom which are provided at the trunk, the robot can smoothly get up from any fallen-down posture. In addition, by reducing the required torque and load on movable portions other than the trunk, and by spreading/averaging out the load between each of the movable portions, concentration of a load on a particular member is prevented from occurring. As a result, the robot is operated more reliably, and energy is used with greater efficiency during a getting-up operation. The robot independently, reliably, and smoothly gets up from various fallen-down postures such as a lying-on-the-face posture, a lying-on-the-back posture, and a lying sideways posture.

5 Claims, 31 Drawing Sheets

U.S. PATENT DOCUMENTS

| | | | |
|---|---|---|---|
| 5,928,093 A | | 7/1999 | Lai |
| 5,928,389 A | | 7/1999 | Jevtic |
| 6,064,164 A | * | 5/2000 | Halfmann .................... 318/439 |
| 6,266,576 B1 | | 7/2001 | Okada et al. |
| 6,289,265 B1 | * | 9/2001 | Takenaka et al. ........... 700/245 |
| 6,362,589 B1 | | 3/2002 | Inoue et al. |
| 6,463,356 B1 | * | 10/2002 | Hattori et al. .............. 700/245 |
| 2001/0049248 A1 | | 12/2001 | Choi |

OTHER PUBLICATIONS

Patent Abstracts of Japan, 63–191528, publication date, Aug. 9, 1988.

Patent Abstracts of Japan, 61–054378, publication date, Mar. 18, 1986.

Patent Abstracts of Japan, 07–205070, publication date, Aug. 8, 1995.

Inaba M et al: "Two–Armed Bipedal Robot That Can Walk, Roll Over and Stand Up" Proceedings. 1995 IEEE/RSJ International Conference on Intelligent Robots and Systems. Human Robot Interaction and Cooperative Robots (Cat. No. 95CB35836), Proceedings 1995 IEEE/RSJ International Conference on Intelligent Robots and Systems. Human Rob, pp. 297–302, vol. 3, XP002164248 1995, Los Alamitos, CA, USA, IEEE Comput. Soc. Press, USA. Inaba M et al: "A 35 DOF Humanoid That Can Coordinate Arms and Legs in Standing Up, Reaching and Grasping an Object" Proceedings of the IEEE/RSJ International Conference on Robots and Systems, US, New York, IEEE, Nov. 4, 1996, pp. 29–36, XP000773256.

Hugel V et al: "Reactive and Adaptive Control Architecture Designed for The Sony Legged Robots League in Robocup 1999" Proceedings. 2000 IEEE/RSJ International Conference on Intelligent Robots and Systems (IROS 2000) (CAT. No. 00CH37113), Proceedings. 2000 IEEE/RSJ International Conference Intelligent Robots and Systems (IROS 2000), Takamatsu, Japan, Oct. 13. Nov. 5, pp. 1032–1037, vol. 2, XP002164249.

Thomas Braunl, Robot soccer by autonomous intelligent vehicles, Nov. 2000, Internet pp. 1–2.

Thomas Braunl, EyeBot, Nov. 2000, Internet pp. 1–2.

Jung et al., Fuzzy rule extraction for shooting action controller of soccer robot, 1999, IEEE, pp. 1–556–1–561.

Astley et al., Design constraints for haptic surgery simulation, 2000, IEEE, pp. 2446–2451.

Rosen et al., Markov modeling of minimally invasive surgery based on tool/tissue interaction and force/torque signatures for evaluating surgical skill, 2001, IEEE, pp. 579–591.

* cited by examiner

G

FIG. 35
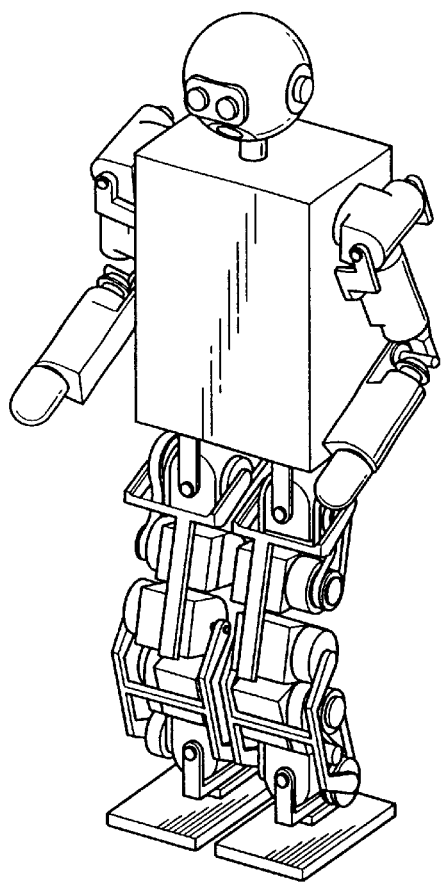
(FRONT SIDE)
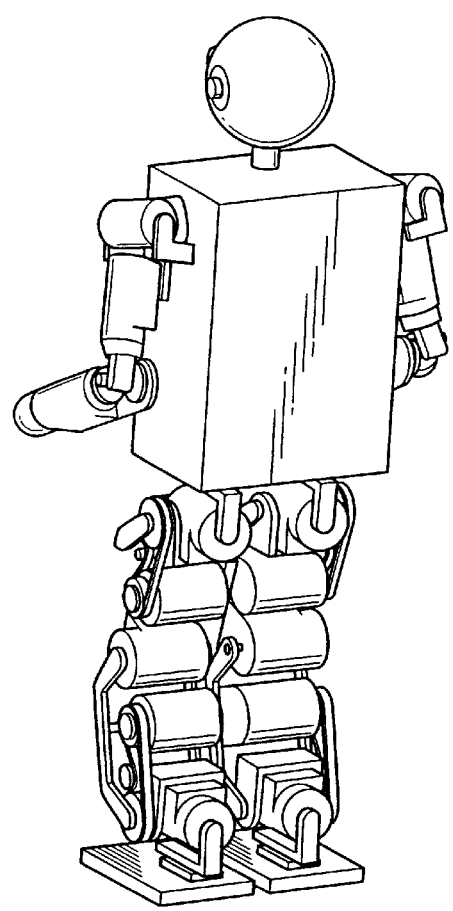
(BACK SIDE)

G

LEGGED MOBILE ROBOT AND METHOD OF CONTROLLING OPERATION OF THE SAME

This is a continuation of application Ser. No. 09/718,629, filed Nov. 22, 2000 now U.S. Pat. No. 6,463,356.

BACKGROUND OF THE INVENTION

1. Field of the Invention

The present invention relates to a realistic robot mechanism which is constructed as a result of modeling the operation and mechanism of a living body, and, more particularly, to a legged mobile robot mechanism in which the mechanism of the body of a legged mobile animal, such as a human being and a monkey, is modeled.

Even more particularly, the present invention relates to a controlling mechanism of a legged mobile robot capable of getting up by itself when it has fallen down while walking or the like. Still more particularly, the present invention relates to a controlling method mechanism for a legged mobile robot which can get up by itself even when it has fallen down in various postures in order to automatically start to work again after the work has been interrupted because it has fallen down.

2. Description of the Related Art

A robot is a mechanical device which emulates the movement of a human being by making use of electrical and magnetic actions. The term robot is said to be derived from the Slavic word ROBOTA (slavish machine). In our country, the use of robots began from the end of the 1960s, many of which were industrial robots, such as manipulators and conveyance robots, used, for example, for the purpose of achieving automatic industrial operations in factories without humans in attendance.

In recent years, progress has been made in the research and development of legged mobile robots which emulate the movements and mechanisms of the body of an animal, such as a human being or a monkey, which walks on two feet while in an erect posture, so that there is a higher expectation of putting them into practical use. The posture and walking of legged mobiles which walk on two feet while in an erect posture are more unstable than those of crawler types or types having four or six legs, so that they are more difficult to control. However, the legged mobiles which walk on two feet while in an erect posture are excellent robots in that they can move and work flexibly because they can move along uneven surfaces such as unleveled surfaces and working paths having, for example, obstacles therein, and walk along walking surfaces which are not continuous, such as going up and down steps and ladders.

Legged mobile robots which emulate the mechanisms and movements of the bodies of human beings are called humanoid robots. Humanoid robots can, for example, help people in life, that is, help them in various human activities in living environments and in various circumstances in everyday life.

The significance of carrying out research and development on humanoid robots can be understood from, for example, the following two viewpoints.

The first viewpoint is related to human science. More specifically, through the process of making a robot whose structure which is similar to a structure having lower limbs and/or upper limbs of human beings, thinking up a method of controlling the same, and simulating the walking of a human being, the mechanism of the natural movement of a human being, such as walking, can be ergonomically understood. The results of such research can considerably contribute to the development of other various research fields which treat human movement mechanisms, such as ergonomics, rehabilitation engineering, and sports science.

The other viewpoint is related to the development of robots as partners of human beings which help them in life, that is, help them in various human activities in living environments and in various circumstances in everyday life. Functionally, in various aspects of the living environment of human beings, these robots need to be further developed by learning methods of adapting to environments and acting in accordance with human beings which have different personalities and characters while being taught by human beings. Here, it is believed that making the form and structure of a robot the same as those of a human being is effective for smooth communication between human beings and robots.

For example, when teaching to a robot a way of passing through a room by avoiding obstacles which should not be stepped on, it is much easier for the user (worker) to teach it to a walking-on-two-feet-type robot which has the same form as the user than a crawler-type or a four-feet-type robot having completely different structures from the user. In this case, it must also be easier for the robot to learn it. (Refer to, for example, Controlling a Robot Which Walks On Two Feet" by Takanishi (Jidosha Gijutsukai Kanto Shibu <Koso> No. 25, April, 1996.)

The working space and living space of human beings are formed in accordance with the behavioral mode and the body mechanism of a human being which walks on two feet while in an upright posture. In other words, for moving present mechanical systems using wheels or other such driving devices as moving means, the living space of human beings has many obstacles. However, it is preferable that the movable range of the robot is about the same as that of human beings in order for the mechanical system, that is, the robot to carry out various human tasks in place of them, and to deeply penetrate the living space of human beings. This is the reason why there are great expectations for putting a legged mobile robot into practical use. In order to enhance the affinity of the robot to the living environment of human beings, it is essential for the robot to possess a human form.

One application of humanoid robots is to make them carry out various difficult operations, such as in industrial tasks or production work, in place of human beings. They carry out in place of human beings dangerous or difficult operations, such as maintenance work at nuclear power plants, thermal power plants, or petrochemical plants, parts transportation/assembly operations in manufacturing plants, cleaning of tall buildings, and rescuing of people at places where there is a fire, and the like.

The most important theme is to design and manufacture industrial robots so that they can be industrially used as specified and can provide the specified functions. Industrial robots are constructed on the assumption that they walk on two feet. However, as mechanical devices, they do not necessarily have to faithfully reproduce the actual body mechanisms and movements of animals, such as human beings or monkeys, which walk while they are in an erect posture. For example, in order to produce an industrial robot for a particular use, the degree of freedom of the movement of particular parts, such as the finger tips, and their operational functions are increased and enhanced, respectively. On the other hand, the degrees of freedom of parts which are considered comparatively unrelated to a task, such as the head, the trunk (the backbone, etc.), and the waist, are limited in number or are not provided. This causes the industrial robot to have an unnatural external appearance when it works and moves, although it is a type of robot which walks on two feet. However, a compromise is inevitable.

Another application of humanoid robots is related to closely connecting them to life, that is, "to the living together with human beings" rather than helping them in life by carrying out difficult tasks in place of human beings. In other words, the ultimate purpose is to make these robots faithfully reproduce whole body harmoniously moving type operation mechanisms which animals, such as human beings and monkeys, which walk on two feet while they are in an erect posture actually have, and to make them move naturally and smoothly. In addition, in emulating highly intelligent animals, such as human beings or monkeys, which stand in an upright posture, an operation using the four limbs is natural for a living body, and it is desirable that the movements are sufficiently indicative of emotions and feelings. Further, the humanoid robot is required not only to faithfully execute a previously input operation pattern, but also to act vividly in response to the words and actions of a person (such as speaking highly of someone, scolding someone, or hitting someone). In this sense, entertainment robots which emulate human beings are rightly called humanoid robots.

As is already well known in the related art, the human body has a few hundred joints, that is, a few hundred degrees of freedom. In order to make the movements of legged mobile robots as close to those of human beings, it is preferable that the legged mobile robots be allowed to virtually have about the same number of degrees of freedom as human beings. However, this is technologically very difficult to achieve. This is because, since at least one actuator needs to be disposed to provide one degree of freedom, a few hundred actuators need to be disposed for a few hundred degrees of freedom. This is impossible to achieve from the viewpoints of production costs and their weight and size and other designing factors. In addition, when the number of degrees of freedom is large, the number of calculations required for, for example, positional/operational control or stable posture control operation is correspondingly increased exponentially.

Accordingly, a humanoid robot is in general constructed so as to possess about a few tens of degrees of freedom at the joints which is far less than that possessed by the human body. Therefore, it can be said that how to achieve natural movement using few degrees of freedom is one important factor in designing/controlling a humanoid robot.

For example, that a flexible mechanism such as a backbone is important for various complicated movements in the life of human beings is already apparent from the viewpoint of ergonomics. The value of existence of the degree of freedom at the trunk joint which signifies the backbone is low, but it is important for entertainment robots and other humanoid robots which are closely connected to life. There is a demand that the flexibility of the robot be capable of being actively adjusted in accordance with the condition.

Legged mobile robots which walk on two feet while they are in an erect posture are excellent robots in that they can walk and move flexibly (such as up and down steps or over obstacles). However, since the number of legs is decreased and the center of gravity of such robots is located at a high position, it becomes correspondingly difficult to perform posture control and stable walking control operations. In particular, in the case of closely connected to life type robots, the walking and the posture of the whole body need to be controlled while they move naturally and in a way sufficiently indicative of emotions and feelings of intelligent animals, such as human beings or monkeys.

Many techniques regarding stable walking control operations and posture control of a legged mobile robot which walks on two feet have already been proposed. Here, stable "walking" means to move using the legs without falling down.

Stable posture control operation of a robot is very important in preventing the robot from falling down. This is because the falling down of the robot means interruption of the execution of the task of the robot, and the need of considerable labor and time for starting the execution of the task again after the robot has got up from its "fallen-down state." Above all, when the robot falls down, the robot itself or the object with which it collides when it falls down may be fatally damaged. Therefore, carrying out a stable posture control operation or preventing the robot from falling down when it is walking is one important factor.

When the robot is walking, the acceleration which is produced when the robot walks and by the gravitational force causes a gravitational force, an inertial force, and the moment of these two forces to act on the surface of a path from the walking system. According to the so-called "d'Alembert's principle," these balance with the floor reaction force and the floor reaction force moment which react in an opposite direction from the surface of the path to the walking system. From the theory of mechanics, it is inferred that there exist a point where the pitch axis moment and the roll axis moment become zero on or within a side of a supporting polygonal form formed by the surface of the path and the points where the soles contact the floor. In other words, a ZMP (zero moment point) exists.

Many of the proposals made to prevent a legged mobile robot from falling down while it is walking or to perform a stable posture control operation on the robot use the ZMP as a standard for determining the walking stability. The generation of a pattern for walking on two feet based on the ZMP as a standard has the advantage of allowing previous setting of the points where the soles contact the floor, making it easier to take into consideration the kinematical limiting conditions of the toes in accordance with the form of the surface of a path.

For example, Japanese Unexamined Patent Publication No. 5-305579 discloses a walking controller of a legged mobile robot. The walking controller disclosed in this document performs a controlling operation so that the ZMP (zero moment point), that is, the point on the floor surface where the moment resulting from the reaction force of the floor when the robot walks is zero matches a target value.

Japanese Unexamined Patent Publication No. 5-305581 discloses a legged mobile robot constructed so that the ZMP is either situated in the inside of a supporting polyhedral (polygonal) member or at a location sufficiently separated by at least a predetermined amount from an end of the supporting polyhedral (polygonal) member when a foot of the robot lands on or separates from the floor. As a result, even when the robot is subjected to an external disturbance, the sufficient predetermined distance of the ZMP makes it possible to cause the robot to walk more stably.

Japanese Unexamined Patent Publication No. 5-305583 discloses the controlling of the walking speed of a legged mobile robot by a ZMP target location. More specifically, in the legged mobile robot disclosed in this document, previously set walking pattern data is used to drive a leg joint so that the ZMP matches a target location, and the tilting of the upper part of the body is detected in order to change the ejection speed of the set walking pattern data in accordance with the detected value. Thus, when the robot unexpectedly steps on an uneven surface and, for example, tilts forward, the original posture of the robot can be recovered by increasing the ejection speed. In addition, since the ZMP can be controlled so as to match the target location, there is no problem in changing the ejection speed in a device for supporting both legs.

Japanese Unexamined Patent Publication No. 5-305585 discloses the controlling of the landing position of a legged mobile robot by a ZMP target location. More specifically, the legged mobile robot disclosed in this document is made to walk stably by detecting any shifts between the ZMP target location and the actually measured position and driving one or both legs so as to cancel the shift, or by detecting the moment around the ZMP target location and driving the legs so that it becomes zero.

Japanese Unexamined Patent Publication No. 5-305586 discloses the controlling of the tilting of the posture of a legged mobile robot by a ZMP target location. More specifically, the legged mobile robot disclosed in this document is made to walk stably by detecting the moment around the ZMP target location and driving the legs so that, when the moment is being produced, the moment is zero.

The greatest effort should be made to previously prevent the robot which is walking from falling down. However, the research of robots which walk on two feet or which have a small number of legs is only at a stage in which the first step towards putting them into practical use has been finally started, so that the possibility of such robots falling down cannot be reduced to zero.

Therefore, in order to put the legged mobile robots into practical use at an early stage, it is important not only to take measures to previously prevent the robots from falling down, but also to minimize damages which result when the robots fall down and to more reliably cause them to start working again, that is, to more reliably cause them to get up or stand up.

In human living environments where there are various obstacles and unexpected situations, the robot cannot be prevented from falling down. In the first place, human beings themselves fall down. Therefore, it is no exaggeration to say that, in order to completely automate the robot, it is essential for the legged mobile robot to include an operation pattern for independently getting up from its fallen-down state.

For example, Japanese Unexamined Patent Publication No. 11-48170 treats the problem of a legged mobile robot falling down. However, this document proposes to reduce to the extent possible damages to the robot itself and to the object with which the robot collides by moving the center of gravity of the robot downward when the robot is about to fall down. Therefore, it discusses nothing about increasing the reliability with which the robot starts operating again after it has fallen down, that is, the reliability with which the robot gets up or stands up.

Even if the robot is described as simply "falling down," the robot takes various postures after it has fallen down. For example, for a bipedal legged mobile robot, there are a plurality of "fallen-down postures" which include a "lying-on-the-face posture," a "lying-on-the-back posture," and a "lying sideways posture." Constructing a robot so that it can only get up from some of these fallen-down postures (for example, from only the "lying-on-the-face posture") is not enough in claiming the construction of a robot which gets up independently and which is completely automated.

For example, a legged mobile robot shown in FIG. 35 will be considered. The robot shown in this figure is a humanoid robot which walks on two feet in an upright posture, and comprises a head, a trunk, lower limbs, and upper limbs. The legs possess the degrees of freedom required for walking, and the arms possess the degrees of freedom required for its supposed tasks. For example, each leg possesses six degrees of freedom, while each arm possesses four degrees of freedom. The trunk is the center of the structural member and connects the legs and arms, and the head. However, the trunk of the robot shown in the figure possesses zero degrees of freedom.

In general, the legged mobile robot walks as a result of relative movements between the portions of the legs which contact the floor and center point of the dynamic moment or the center of gravity. When the robot is a type which walks on two feet, movement in a predetermined direction is achieved by alternately placing the left and right legs in a "standing state" and a "swinging state." Here, it is basically necessary to move the center of the dynamic moment or the center of gravity of the body towards the "standing state" side, and in a predetermined direction of movement. In the legged mobile robot, these movements are achieved by harmonious actuation which is achieved by the degrees of freedom at the joints of the portions of the robot. When the legged mobile robot has legs each possessing six or more degrees of freedom, such as the robot shown in FIG. 35, the center of the dynamic moment or the center of gravity of the body when the robot is walking can be moved as a result of the degrees of freedom of the legs.

FIG. 36 shows a state in which the legged mobile robot shown in FIG. 35 is in an upright state. In this upright posture, the center of gravity of the robot as viewed from the direction of the front side of its body is above the center portions of both legs, and the ZMP is situated within a stable posture area, substantially midway between the portions of both legs which contact the floor.

FIG. 37 shows a state in which the center of gravity is moved to one of the legs (the left leg in the figure) to allow the legged mobile robot to walk. In other words, the ZMP is moved to within an area where the left foot contacts the floor by moving the center of gravity of the robot towards the left leg as a result of movement primarily involving a displacement of a left hip joint and a displacement of a left ankle joint in a roll direction, and a corresponding displacement of a right hip joint and a corresponding displacement of a right ankle joint in the roll direction. As a result, the robot takes a posture which can support the whole weight of the body only by the left leg. In addition, the robot can walk by stepping forward in a desired direction of movement its right leg which is in a "swinging state."

A bipedal legged mobile robot which is primarily assumed to walk can walk using only the degrees of freedom of the legs depending on the degree-of-freedom arrangement. Such a walking operation pattern is often used in actual machines. In addition, in order to perform tasks, the robot is generally constructed so as to possess separate degrees of freedom at the arms and hands. Further, the head often possesses degrees of freedom for visual perception and the like.

In contrast, it cannot be said that the degrees of freedom of the trunk are required for an operation pattern for primarily causing the robot to walk or perform tasks. Therefore, the trunks of most of the legged mobile robots which are presently being developed for practical purposes do not possess any degrees of freedom, as shown in FIG. 35 (discussed above).

A getting-up operation of a legged mobile robot which does not possess degrees of freedom at the trunk, such as that shown in FIG. 35, when the robot has fallen down will be considered.

For example, when the robot is to get up from the "lying-on-the-face posture" such as that shown in FIG. 38, actuation is performed at the pitch axes of both hip joints and both arms, etc., in order to cause only the arms and legs (knees) to contact the floor. Then, the relative distances between portions of the arms and corresponding portions of the legs which contact the floor are gradually decreased in order to move the center of gravity of the robot upward (see FIG. 39).

The feet are moved forward (see FIG. 40) at the same time that the center of gravity is moved upward. As a result, the center of gravity moves above an area where the feet contact the floor, and the ZMP moves into a floor contacting area, that is, a stable posture area, making it possible to move the arms off the surface of the floor (see FIG. 41). In addition, by extending the legs (knee joints) in order to move the center of gravity upward, the getting-up operation is completed (see FIG. 42).

However, since problems regarding interference between the portions of the robot and the movement angle of each joint exist, it is often the case that the center of gravity cannot be moved sufficiently. For example, when changing from the posture shown in FIG. 40 to that shown in FIG. 41, the knees cannot be sufficiently bent while the arms are in contact with the floor, making it impossible to move the ZMP to the area where the feet contact the floor. When an attempt is made to forcibly move the ZMP to the area where the feet contact the floor, the arms move off the floor before the ZMP moves into the stable area, so that the robot cannot get up properly.

When, as shown in FIG. 43, the legged mobile robot falls down in the lying-on-the-back posture, it is even more difficult for the robot to get up independently, that is, without any physical help from the outside.

When carrying out a getting-up operation from the lying-on-the-back posture, the robot is first made to take a posture in which it contacts the floor with the legs and arms in order to move the center of gravity upwards (see FIG. 44). Then, the relative distances between the portions of the feet which contact the floor and the corresponding portions of the arms which contact the floor are gradually decreased (see FIG. 45).

When the relative distances between the feet and the corresponding arms are made sufficiently small, the center of gravity of the robot can be moved to above the area where the feet contact the floor (see FIG. 46). In this state, the ZMP enters within the feet or stable posture area, so that, by moving the arms off the surface of the floor, and extending the legs, that is, the knees in order to move the center of gravity further upwards, the getting-up operation is completed (see FIG. 47).

However, actually, problems such as interference between portions of the robot and the movement angle of each joint exist as with the case where the robot gets up from the lying-on-the-face state, so that there are many times when the center of gravity cannot be sufficiently moved. For example, when the posture changes from that shown in FIG. 45 to that shown in FIG. 46, the knees cannot be sufficiently bent while the arms are in contact with the floor, so that the ZMP cannot be moved to the area where feet contact the floor. When an attempt is made to forcibly move the ZMP, the arms move off the ground before the ZMP moves into the stable area, so that the robot cannot get up properly.

In the cases where the getting-up operation from the lying-on-the-face posture shown in FIGS. 38 to 42, and from the lying-on-the-back posture shown in FIGS. 43 to 47 are executed, the angles of movements of the hip joints towards the front side of the body are increased in order to make it possible to prevent a bottleneck shown in FIGS. 40 and 41 and FIGS. 46 and 47. However, in order to increase the angles of movements of the hip joints of the actual legged mobile robots, interference occurs between the trunk and the portions therearound, so that it cannot be said that this actually solves the problems.

In the cases where the getting-up operations from the lying-on-the-face posture and from the lying-on-the-back posture are executed, when the center of gravity of the whole legged mobile robot is set near the feet by constructing very heavy feet, the ZMP can be moved to the stable posture area even when the arms move off the ground first as shown in FIGS. 41 and 47. This is similar to the principle on which a "daruma" naturally gets up.

In the case where a "static walking type" robot in which the center of gravity thereof is always within the area where the soles contact the floor while it is walking, it is possible to ensure stable walking even when, as in a "daruma," the center of gravity of the whole robot is situated at a low place such as at the feet.

In contrast, in the case of a "dynamic walking type" robot in which the center of gravity of the robot is situated outside the area of the soles, the posture of the robot is restored by greatly accelerating a fulcrum in the direction in which the robot has fallen down while the robot is walking, so that the concept of an "inverted pendulum" is made use of. In other words, in the case of the "dynamic walking type" robot, in order to allow dynamic movement of the center of gravity, the legs are designed to be relatively light with respect to the condition such that the center of gravity is situated at a relatively high place. On the other hand, when the mass of each leg is large, it becomes difficult to move the center of gravity smoothly, so that the walking of the robot is hindered. To recapitulate, setting the center of gravity of the whole robot at a low place makes it difficult to perform a stable posture control operation when it is walking dynamically, so that what has been mentioned above cannot be a general solution for a legged mobile robot which gets up.

As can be seen from FIGS. 38 to 42 and from FIGS. 43 to 47, when a legged mobile robot which does not possess any degrees of freedom at the trunk is used, the amount of movement of the arms, head, etc., and legs relative to each other are small, making it difficult for the robot to get up from either one of the fallen-down postures.

By forming the trunk of the robot very short, or by forming the arms very long, the amount of movement between the arms and legs relative to each other can be increased. This eliminates the problem of the arms moving off the floor before the ZMP moves into the stable posture area as shown in FIGS. 41 and 47, making it possible for the robot to get up.

However, when the trunk is made short or the arms are made long, the four limbs or the whole body of the humanoid robot is no longer proportioned, thereby departing from the spirit of the invention of producing a human-like or humanoid robot.

At the time this application was filed, there was a tendency to frequently install a unit for controlling the robot itself at the back side portion thereof. Therefore, when the robot fell down in the laying-on-the-back posture, the center of gravity greatly shifted towards the back surface side thereof. Accordingly, it was supposed even more difficult for such a robot to get up from the lying-on-the-back posture (see FIG. 48).

SUMMARY OF THE INVENTION

Accordingly, it is an object of the present invention to provide an excellent legged mobile robot mechanism in which the mechanism of the body of a legged mobile animal, such as a human being and a monkey, is modeled.

It is another object of the present invention to provide an excellent legged mobile robot which can get up by itself even when it has fallen down while walking or performing a task, and a controlling mechanism thereof.

It is still another object of the present invention to provide an excellent legged mobile robot which can automatically start to work again after interruption of a task because it has fallen down by independently getting up even when it lies in various postures when it has fallen down, and a controlling method mechanism thereof.

It is still another object of the present invention to provide an excellent legged mobile robot which can independently, reliably, and smoothly get up from various fallen-down postures such as a lying-on-the-face posture, a lying-on-the-back posture, and a lying sideways posture, and a controlling mechanism thereof.

To these ends, according to a first aspect of the present invention, there is provided a legged mobile robot which comprises at least lower limbs and an upper part of a body disposed above the lower limbs, and which is movable by the movement of the lower limbs. The legged mobile robot further comprises means for determining whether or not the robot has fallen down, means for determining the posture of the robot when the robot has fallen down, and means for executing a getting-up operation pattern in accordance with the fallen-down posture.

According to a second aspect of the present invention, there is provided a legged mobile robot which comprises at least lower limbs and an upper part of a body disposed above the lower limbs and possessing a predetermined movement allowing degree of freedom at a trunk, and which is movable by the movement of the lower limbs. The legged mobile robot further comprises means for determining whether or not the robot has fallen down, means for determining the posture of the robot when the robot has fallen down, and means for executing a getting-up operation pattern in accordance with the fallen-down posture.

According to a third aspect of the present invention, there is provided a legged mobile robot which comprises at least lower limbs and an upper part of a body disposed above the lower limbs and possessing a predetermined movement allowing degree of freedom at a trunk, and which is movable by the movement of the lower limbs. The legged mobile robot further comprises means for determining whether or not the robot has fallen down, and means for executing a getting-up operation pattern involving at least a displacement in correspondence with the movement allowing degree of freedom at the trunk, when the robot has fallen down.

In a first form of the third aspect of the present invention, the trunk may possess at least a movement allowing degree of freedom in a pitch axis direction, and the getting-up operation pattern may use the movement allowing degree of freedom in the pitch axis direction of the trunk.

In a second form of the third aspect of the present invention, the trunk may possess at least a movement allowing degree of freedom in a yaw axis direction, and the getting-up operation pattern may use the movement allowing degree of freedom in the yaw axis direction of the trunk.

In a third form of the third aspect of the present invention, the trunk may possess at least a movement allowing degree of freedom in a roll axis direction, and the getting-up operation pattern may use the movement allowing degree of freedom in the roll axis direction of the trunk.

According to a fourth aspect of the present invention, there is provided a legged mobile robot which comprises at least lower limbs and an upper part of a body disposed above the lower limbs and possessing a predetermined movement allowing degree of freedom at a trunk, and which is movable by the movement of the lower limbs. The legged mobile robot further comprises means for determining whether or not the robot has fallen down, means for determining the posture of the robot when the robot has fallen down, and means for executing an operation pattern for changing to another fallen-down posture when the robot has fallen down.

In a first form of the fourth aspect of the present invention, the trunk may possess at least a movement allowing degree of freedom in a pitch axis direction, and the operation pattern for changing to another fallen-down posture may use the movement allowing degree of freedom in the pitch axis direction of the trunk.

In a second form of the fourth aspect of the present invention, the trunk may possess at least a movement allowing degree of freedom in a yaw axis direction, and the operation pattern for changing to another fallen-down posture may use the movement allowing degree of freedom in the yaw axis direction of the trunk.

In a third form of the fourth aspect of the present invention, the trunk may possess at least a movement allowing degree of freedom in a roll axis direction, and the operation pattern for changing to another fallen-down posture may use the movement allowing degree of freedom in the roll axis direction of the trunk.

According to a fifth aspect of the present invention, there is provided an operation controlling method for controlling the operation of a legged mobile robot when the robot has fallen down in a lying-on-the-face posture, the robot comprising at least lower limbs and an upper part of a body disposed above the limbs and possessing a predetermined movement allowing degree of freedom at a trunk, and being movable by the movement of the lower limbs. The method comprises the steps of causing the robot to take a posture where only arms and the legs contact a floor by using at least a movement allowing degree of freedom at a trunk pitch axis, moving the center of gravity of the legged mobile robot upward by using at least the movement allowing degree of freedom at the trunk pitch axis, decreasing relative positions where portions of the arms and corresponding portions of the legs contact a floor by using at least the movement allowing degree of freedom at the trunk pitch axis, and, as a result of moving the portions of the arms which contact the floor and the corresponding portions of the legs which contact the floor sufficiently close to each other, starting extending the whole body in response to the entrance of a ZMP,of the legged mobile robot into an area where the feet contact the floor.

According to a sixth aspect of the present invention, there is provided an operation controlling method for controlling the operation of a legged mobile robot when the robot has fallen down in a lying-on-the-back posture, the robot comprising at least lower limbs and an upper part of a body disposed above the lower limbs and possessing a predetermined movement allowing degree of freedom at a trunk, and being movable by the movement of the lower limbs. The method comprises the steps of causing the robot to take a posture where the upper part of the body is raised by using at least a movement allowing degree of freedom at a hip joint pitch axis, moving the center of gravity of the legged mobile robot forward by using at least a movement allowing degree of freedom at a trunk pitch axis, and, as a result of moving the center of gravity sufficiently forward, starting extending the whole body in response to the entrance of a ZMP of the legged mobile robot into an area where the feet contact a floor.

According to a seventh aspect of the present invention, there is provided an operation controlling method for controlling the operation of a legged mobile robot when the robot has fallen down in a lying sideways posture, the robot comprising at least lower limbs and an upper part of a body disposed above the lower limbs and possessing a predetermined movement allowing degree of freedom at a trunk, and being movable by the movement of the lower limbs. The method comprises the step of causing the robot to take a lying-on-the-face posture by using at least a movement allowing degree of freedom at a trunk yaw axis.

According to an eighth aspect of the present invention, there is provided an operation controlling method for controlling the operation of a legged mobile robot when the robot has fallen down in a lying sideways posture, the robot comprising at least lower limbs and an upper part of a body disposed above the lower limbs and possessing a predetermined movement allowing degree of freedom at a trunk, and being movable by the movement of the lower limbs. The method comprises the steps of causing the upper part of the body of the robot to be raised from the surface of a floor by using a movement allowing degree of freedom at a trunk roll axis, and causing the robot to take a lying-on-the-face posture by using a movement allowing degree of freedom at a trunk yaw axis.

According to a ninth aspect of the present invention, there is provided an operation controlling method for controlling the operation of a legged mobile robot when the robot has fallen down in a lying-on-the-back posture, the robot comprising at least lower limbs and an upper part of a body disposed above the lower limbs and possessing a predetermined movement allowing degree of freedom at a trunk, and being movable by the movement of the lower limbs. The method comprises the step of causing the robot to take a lying sideways posture by using at least a movement allowing degree of freedom at a trunk yaw axis.

According to a tenth aspect of the present invention, there is provided an operation controlling method for controlling the operation of a legged mobile robot when the robot has fallen down in a fallen-down posture, the robot comprising at least lower limbs and an upper part of a body disposed above the lower limbs and possessing a predetermined movement allowing degree of freedom at a trunk, and being movable by the movement of the lower limbs. The method comprises at least one of the steps of (a) changing the posture of the robot from a lying-on-the-back posture to a lying sideways posture, (b) changing the posture of the robot from the lying sideways posture to a lying-on-the-face posture, (c) changing the posture of the robot from the lying-on-the-face posture to the lying sideways posture, and (d) changing the posture of the robot from the lying sideways posture to the lying-on-the-back posture.

The legged mobile robot has degrees of freedom which are provided at the roll axis, the pitch axis, and the yaw axis at the trunk thereof. By using these degrees of freedom provided at the trunk, it is possible for the robot to smoothly and easily get up from any fallen-down posture.

According to the legged mobile robot of the present invention, by using the degrees of freedom of the trunk when the robot is getting up from its fallen-down state, the load and required torque on the movable portions of the robot other than the trunk are reduced. In addition, by spreading/averaging out the load between each of the movable portions, it is possible to prevent the load from concentrating on a particular portion of the robot. Therefore, the robot is more reliably used, and the efficiency with which energy is used when the robot is getting up is increased.

According to the legged mobile robot of the present invention, by successively changing fallen-down postures from one fallen-down posture to another fallen-down posture, an easier getting-up operation can be selectively executed.

According to the legged mobile robot of the present invention, by successively repeating a plurality of fallen-down postures, the robot can move in a plane without getting up. Therefore, the robot can get up after moving to a location where it can get up easily.

According to the legged mobile robot of the present invention, the fallen-down posture can be changed, so that it is possible to reduce the number and types of getting-up operation patterns which must be supported.

For example, when the robot previously provides the getting-up operation patterns of the robot, the development period and development costs can be decreased as a result of decreasing the number of operation patterns. By reducing the number of operation patterns, the load on the hardware can be reduced, so that the system can be expected to improve correspondingly.

When the robot independently generates operation patterns in accordance with the condition of the robot, by reducing the number of operation patterns to be generated, the load on the computing unit which needs to be installed in the robot itself is reduced, making it possible to expect reduced device manufacturing costs and more reliable operations of the robot.

According to the legged mobile robot of the present invention, it is possible to limit the getting-up operation patterns by changing the fallen-down posture of the robot. As a result, for example, the operational range and output torque of each of the actuators required to cause the robot to get up are reduced. Therefore, the robot can be designed with greater freedom, and the development period and manufacturing costs can be reduced.

The methods which are performed to cause the robot to get up can be limited as a result of changing the fallen-down posture, so that, during the getting-up operation, it is possible to save consumption electrical power of the robot, and to reduce the load on the supply power such as a battery. Therefore, it is possible to increase the battery actuation time, and to perform continuous operations for a long time by one charging operation, as a result of which, for example, the robot working time, working space, and working details are increased. In addition, since the required battery capacity is also reduced, the battery can be made smaller and lighter, so that the robot is designed with greater freedom. Further, since the number of specification requirements of the battery is reduced, the cost of the battery is reduced, making it possible to cut down operation and manufacturing expenses of the system as a whole.

Other objects, features, and advantages of the present invention will become manifest from a more detailed description with reference to an embodiment of the present invention described below and the attached drawings.

BRIEF DESCRIPTION OF THE DRAWINGS

FIG. 8 illustrates a state immediately after the legged mobile robot 100 has fallen on the floor in the "lying-on-the-face posture."

FIG. 9 illustrates a state in which the legged mobile robot 100 in the "lying-on-the-face posture" starts to get up.

FIG. 10 illustrates a state in which the position of the center of gravity is moved upward by further increasing the displacements of both shoulder joint pitch axis actuators $A_8$, a trunk pitch axis actuator $A_5$, and hip joint pitch axis actuators $A_{17}$.

FIG. 11 illustrates a state in which the center of gravity G is situated above the feet, that is, is completely accommodated within a stable posture area as a result of further decreasing the distances between portions of the arms which contact the floor and corresponding portions of the feet which contact the floor.

FIG. 12 illustrates a state in which the center of gravity G is moved further upward as a result of moving the ends of the arms off the floor and extending the legs by actuating both knee pitch axis actuators $A_{19}$.

FIG. 13 illustrates a state in which the robot is nearing its upright posture as a result of further moving the center of gravity G upward.

FIG. 14 illustrates a state immediately after the legged mobile robot 100 has fallen on the surface of the floor in the "lying-on-the-back posture."

FIG. 15 shows a state in which the legged mobile robot 100 whose fallen-down posture has been determined starts to get up from its "lying-on-the-back posture" after it has fallen down.

FIG. 16 illustrates a state in which the robot prepares itself to take a posture in which the soles of both feet contact the floor as a result of further actuating both hip joint pitch axis actuators $A_{17}$, both knee pitch axis actuators $A_{19}$, and both ankle pitch axis actuators $A_{20}$ when the waist is in contact with the floor.

FIG. 17 illustrates a state in which the center of gravity G is moved upward as a result of displacing the trunk pitch axis actuator $A_5$ and, at the same time, decreasing the distances between the portions of the arms that contact the floor and the corresponding portions of the legs that contact the floor.

FIG. 18 illustrates a state in which the arms and waist are moved off the floor by moving the ZMP towards the feet to the extent possible as a result of decreasing the distances between the portions of the arms that contact the floor and the corresponding portions of the legs that contact the floor.

FIG. 19 illustrates a state in which the center of gravity G is moved further upward by making the robot assume an extended posture.

FIG. 20 illustrates a state in which the robot is nearing its upright posture as a result of moving the center of gravity G upward by further extending the legs.

FIG. 21 illustrates a state immediately after the legged mobile robot 100 has fallen down on the surface of the floor in the "lying sideways posture."

FIG. 22 illustrates a state in which the execution of the operation pattern is started in order to change the posture of the legged mobile robot 100, after determining that it is in the "lying sideways posture," to the "lying-on-the-face posture."

FIG. 23 illustrates a state in which the upper part of the body of the robot is nearing the "lying-on-the-face posture" as a result of rotating a trunk yaw axis actuator $A_7$.

FIG. 24 illustrates a state in which the robot is further nearing the "lying-on-the-face posture" by causing the left arm to come into contact with the floor.

FIG. 25 illustrates a state in which the left arm is in contact with the floor by causing the whole body of the legged mobile robot 100 to fall towards the front side of the plane of the figure as a result of continuing the rotation of the trunk yaw axis actuator $A_7$ and the left hip joint pitch axis actuator $A_{17}$.

FIG. 26 illustrates a state in which the robot is completely in the "lying-on-the-face posture" as a result of continuing the rotation of the trunk yaw axis actuator $A_7$ and the left hip joint pitch axis actuator $A_{17}$.

FIG. 27 illustrates a state in which the posture of the robot changes smoothly from the "lying sideways state" to the "lying-on-the-face posture" as a result of actuating the trunk yaw axis actuator $A_7$ and a trunk roll axis actuator $A_6$.

FIG. 28 illustrates a state in which the posture of the robot changes smoothly from the "lying sideways state" to the "lying-on-the-face posture" as a result of actuating the trunk yaw axis actuator $A_7$ and the trunk roll axis actuator $A_6$.

FIG. 29 illustrates a state immediately after the legged mobile robot 100 has fallen on the surface of the floor in the "lying-on-the-back posture."

FIG. 30 illustrates a state in which the upper part of the body is relatively twisted by rotating both hip joint yaw axis actuators $A_{16}$ and the center of gravity is moved in the twisting direction as a result of the rotation at the left and right joint pitch axes.

FIG. 31 illustrates a state in which the whole right leg is further rotated in the twisting direction as a result of rotating the right hip joint yaw axis actuator $A_{16}$.

FIG. 32 illustrates a state in which contact of the right arm with the floor is ensured as a result of rotating the trunk yaw axis actuator $A_7$.

FIG. 33 illustrates a state in which the twisting movement is smoothly executed as a result of twisting the waist in a predetermined direction of rotation by primarily rotating the right hip joint yaw axis actuator $A_{16}$.

FIG. 34 illustrates a state in which the changing of the posture of the legged mobile robot 100 to the "lying sideways posture" is almost completed.

FIG. 35 is an external view of the structure of a (conventional) legged mobile robot which walks in an upright posture on two feet.

FIG. 37 illustrates a state in which the left and right legs alternately switch between a "standing state" and a "swinging state."

FIG. 39 illustrates a state in which the center of gravity of the robot is moved upward by decreasing the relative distances between portions of the arms which contact the floor and corresponding portions of the legs which contact the floor (conventional example).

FIG. 40 illustrates a state in which the feet are moved forward while the center of gravity of the robot is being moved upward (conventional example).

FIG. 40 illustrates a state in which the arms are moved off the floor as a result of moving the ZMP of the legged mobile robot within a stable posture area (conventional example).

FIG. 42 illustrates a state in which the getting-up operation is completed as a result of further extending the legs after the arms of the legged mobile robot have been moved off the floor (conventional example).

FIG. 44 illustrates a state in which the center of gravity is moved upward by causing the robot to assume a posture in which the arms and the legs contact the surface of the floor (conventional example).

FIG. 45 illustrates a state in which the relative distances between the feet and arms of the legged mobile robot which are in contact with the floor are decreased (conventional example).

FIG. 46 illustrates a state in which the position of the center of gravity of the legged mobile robot is moved to above areas where the feet contact the floor (conventional example).

FIG. 47 illustrates a state in which the getting-up operation has been completed as a result of further extending the legs after moving the arms of the legged mobile robot off the surface of the floor.

DESCRIPTION OF THE PREFERRED EMBODIMENTS

Hereunder, a description of a preferred embodiment of the present invention will be given in detail with reference to the drawings.

Figure 1:
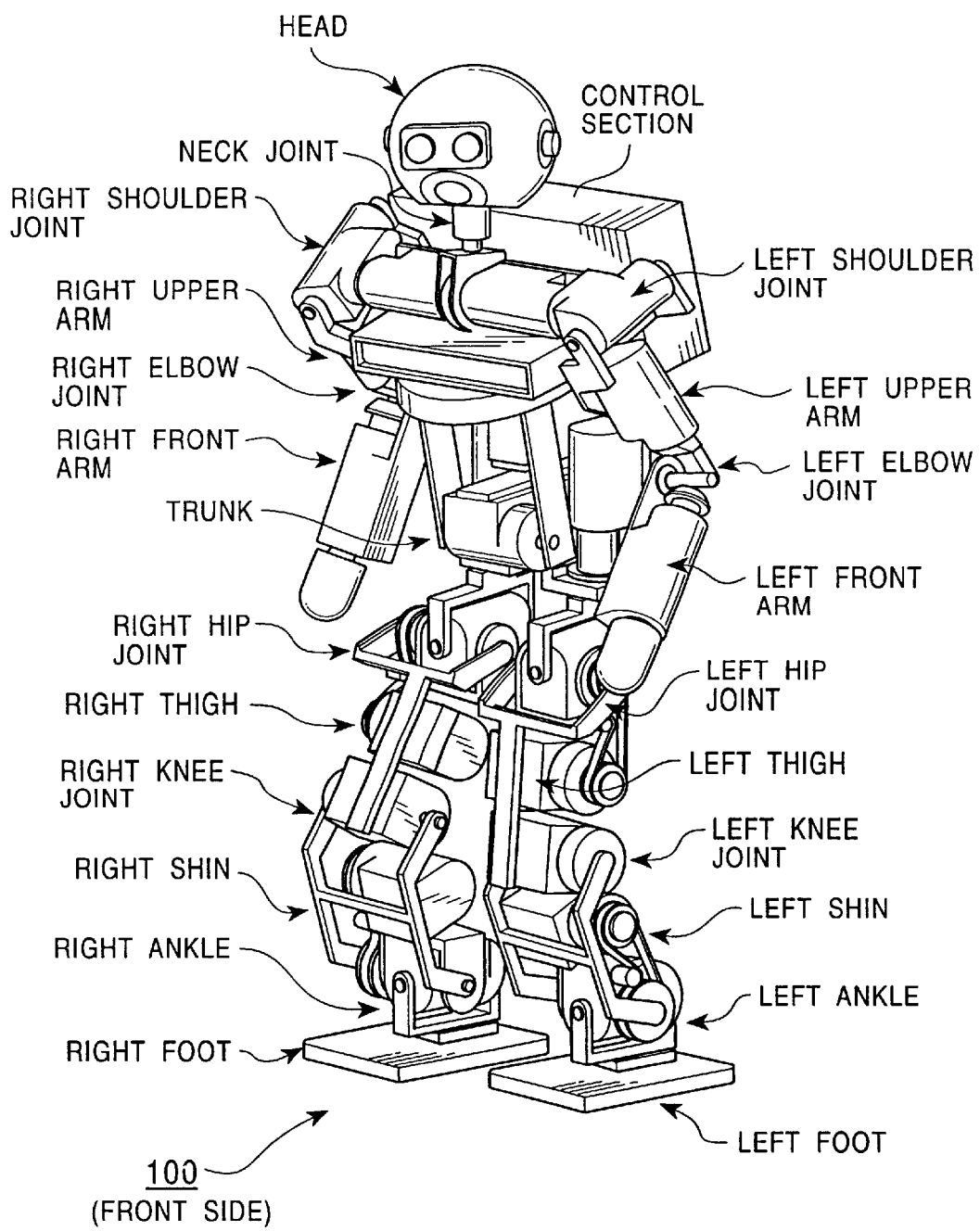
FIG. 1 a front view of an embodiment of a legged mobile robot 100 of the present invention.
Figure 2:
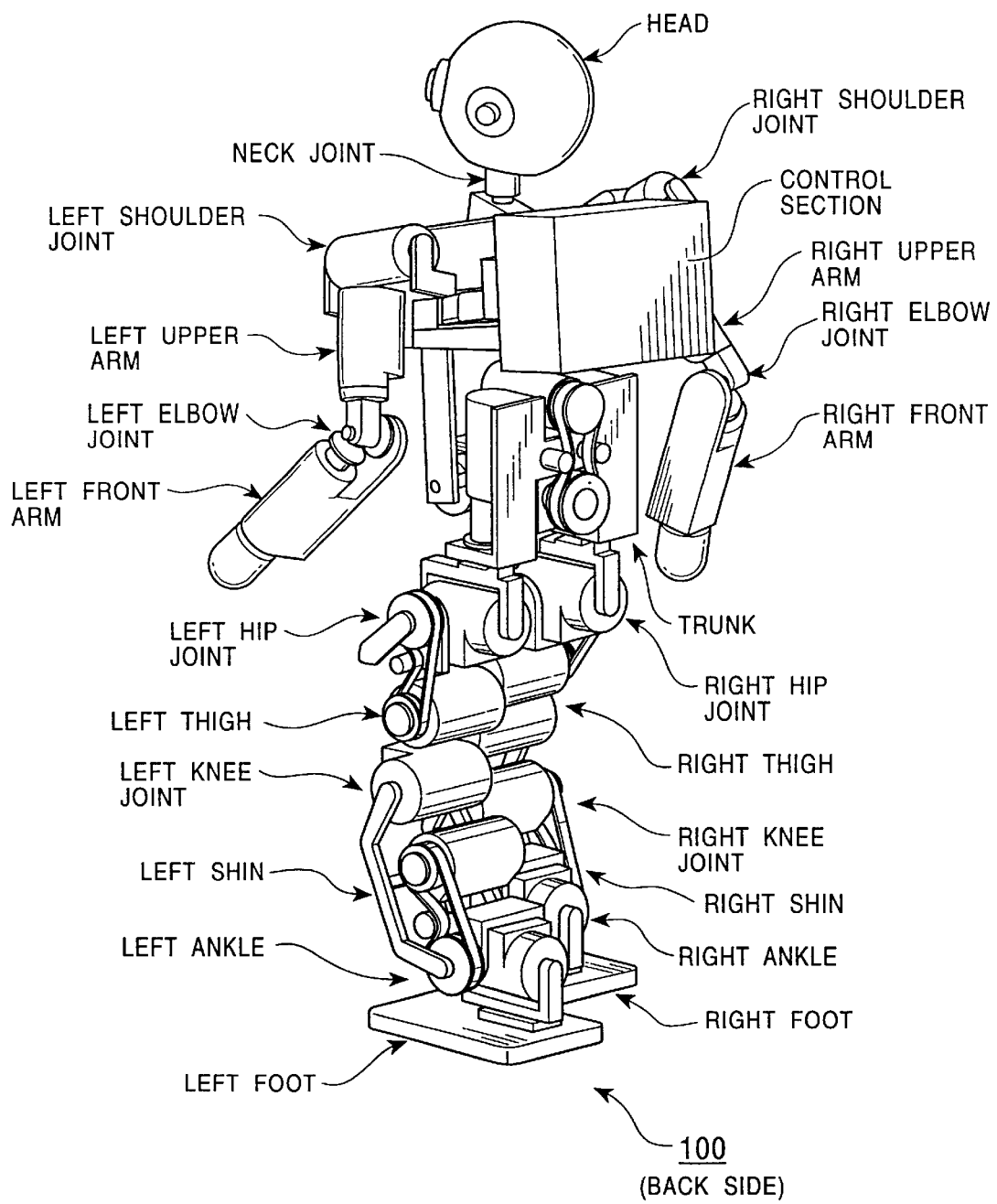
FIG. 2 is a back view of the embodiment of the legged mobile robot 100 of the present invention.

FIGS. 1 and 2 are front and back views showing a humanoid legged mobile robot 100 of an embodiment of the present invention standing in an upright position. As shown in the figures, the legged mobile robot 100 comprises lower limbs or the left and right legs used for movement, a trunk, left and right upper limbs, a head, and a control section.

The left and right lower limbs each comprise a thigh, a knee joint, a shin, an ankle, and a foot, and are connected to substantially the bottom end of the trunk by corresponding hip joints. The left and right upper limbs comprise corresponding upper arms, elbow joints, and front arms, and are connected to their corresponding upper left and right side edges of the trunk by corresponding shoulder joints. The head is connected to substantially the uppermost end center portion of the trunk by a neck joint.

The control section is a housing in which a controller (a main control section) for controlling the actuation of each joint actuator making up the legged mobile robot 100 and for processing externally input information from, for example, each sensor (described later), and peripheral devices such as a power supply circuit. The control section may also include a remote-control communications interface or a communications device. In the FIGS. 1 and 2, the control section is carried on the back of the legged mobile robot 100, but the place where the control section is disposed is not particularly limited.

One feature of the legged mobile robot 100 of the embodiment is that the trunk thereof is provided with degrees of freedom at the joint thereof. In order for the legged mobile robot 100 to coexist with human beings, it is important to provide a mechanism which is as flexible as a vertebral mechanism to carry out various types of complicated operations in the living environment/space of human beings (mentioned earlier). The degrees of freedom provided at the joint of the trunk correspond to the spine of a human being.

Figure 3:
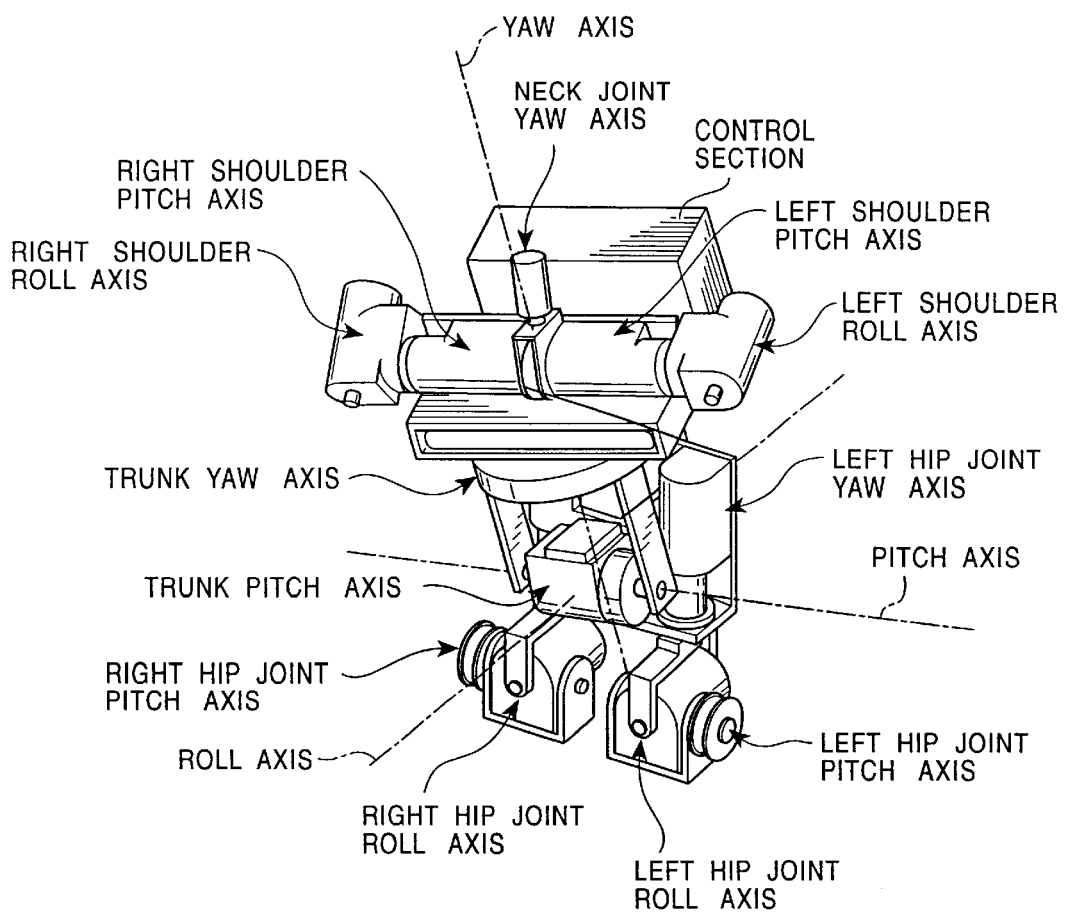
FIG. 3 is an enlarged (front perspective) view of the structure of a trunk of the legged mobile robot 100.
Figure 4:
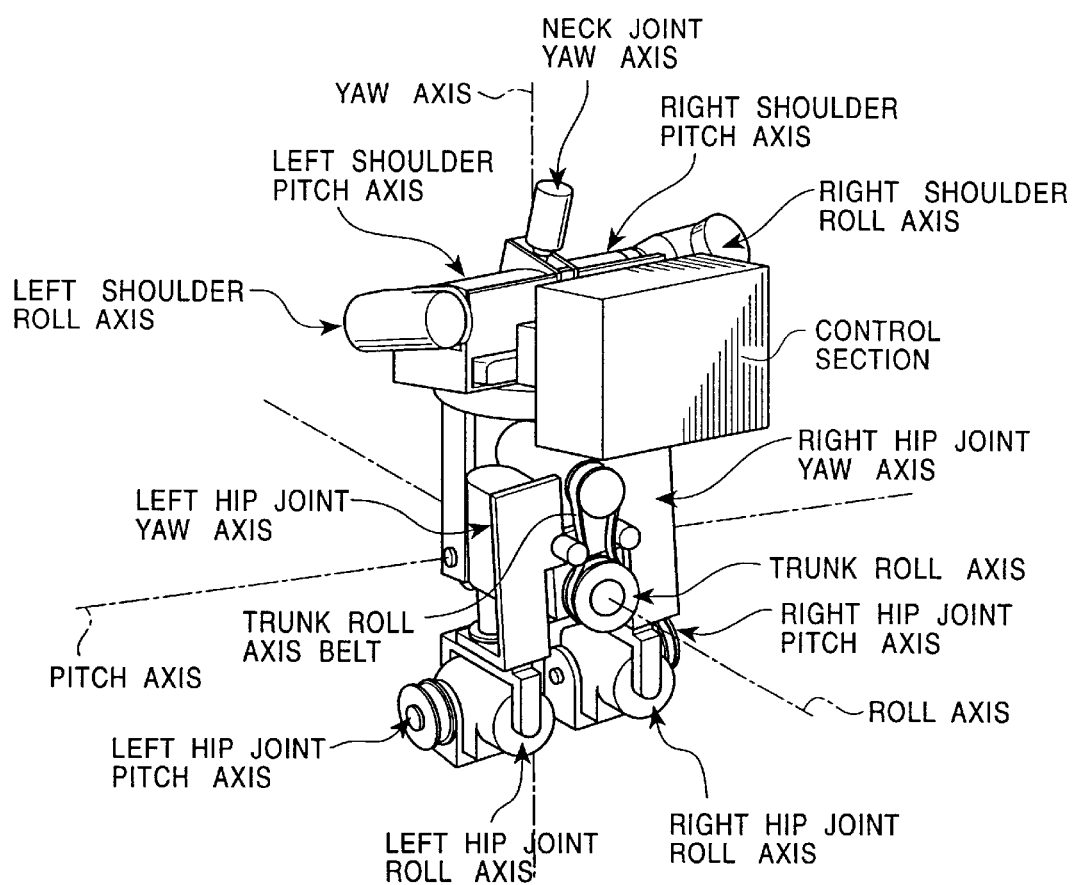
FIG. 4 is an enlarged (back perspective) view of the structure of the trunk of the legged mobile robot 100.

FIGS. 3 and 4 are enlarged views showing the structure of the trunk of the legged mobile robot 100.

As shown in these figures, the joint of the trunk possesses three degrees of freedom which are provided in correspondence with a trunk roll axis, a trunk pitch axis, and a trunk yaw axis. For example, by performing a trunk roll axis actuation operation, the legged mobile robot 100 can shake its upper part of the body towards the left and right with respect to its lower limbs. By performing a trunk pitch axis actuation operation, the legged mobile robot can bend itself so as to have a V-shaped posture in a sagittal plane. By performing a trunk yaw axis actuation operation, the legged mobile robot can rotate its upper body relative to its lower limbs so as to assume a twisted posture.

Figure 5:
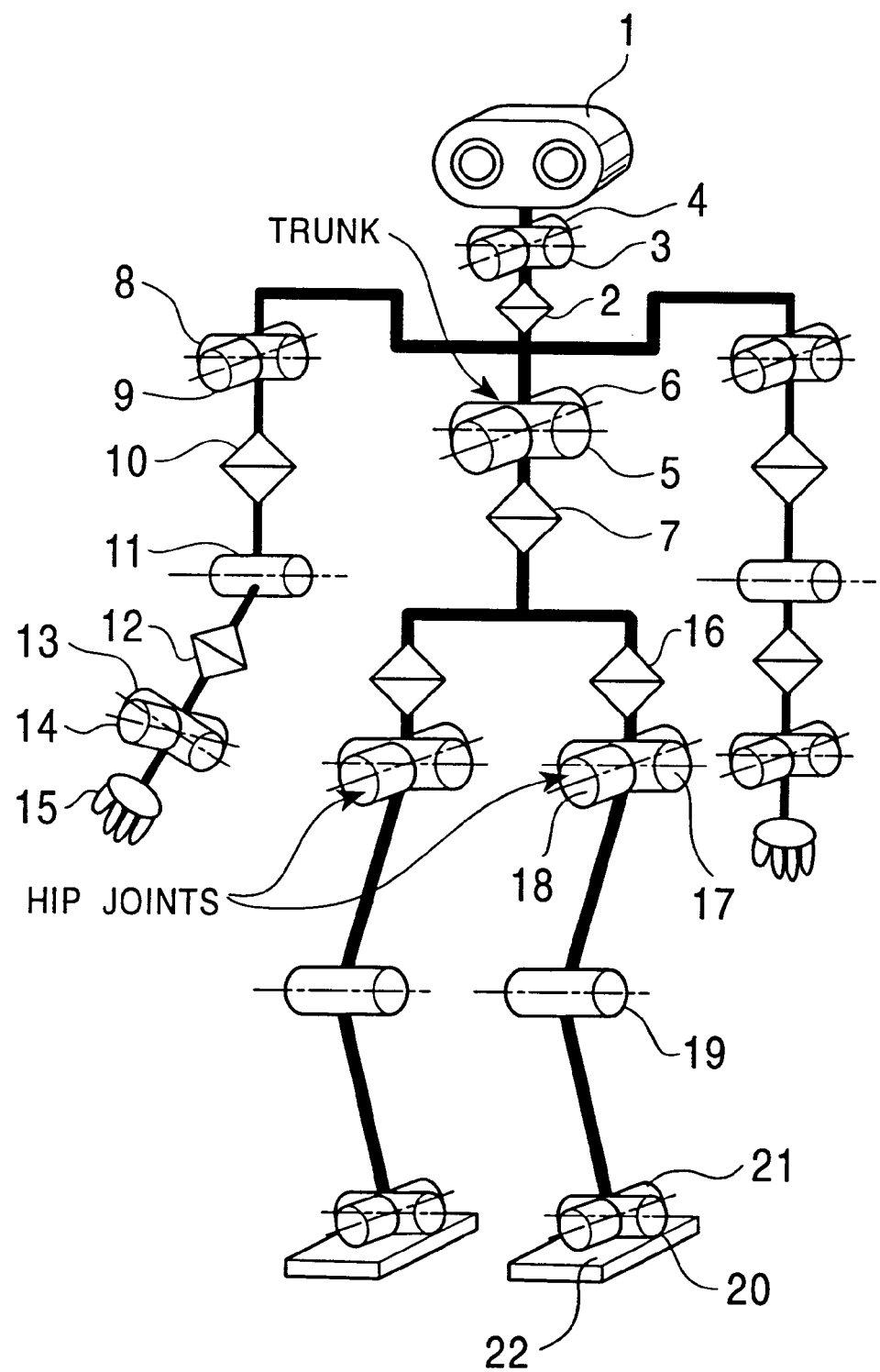
FIG. 5 schematically shows a degree-of-freedom structure model of the embodiment of the legged mobile robot 100.

FIG. 5 schematically illustrates a joint structure of the legged mobile robot 100, which provides the degrees of freedom thereof.

As shown in FIG. 5, the legged mobile robot 100 comprises an upper part of the body including two arms and a head 1, lower limbs or two legs used for movement, and a trunk which connects upper limbs and the lower limbs.

A neck joint which supports the head 1 possesses three degrees of freedom which are provided in correspondence with a neck joint yaw axis 2, a neck joint pitch axis 3, and a neck joint roll axis 4.

Each arm includes a shoulder joint pitch axis 8, a shoulder joint roll axis 9, an upper arm yaw axis 10, an elbow joint pitch axis 11, a front arm yaw axis 12, a wrist joint pitch axis 13, a wrist joint roll axis 14, and a hand 15. Each hand 15 is actually a structure including a plurality of fingers so as to have many joints and degrees of freedom. However, since the operation of each hand 15 itself rarely contributes to and influences the stable posture control operations and the walking controlling operations of the robot 100, each hand in the embodiment is assumed to possess zero degrees of freedom. Therefore, in the embodiment, each arm possesses seven degrees of freedom.

The trunk possesses three degrees of freedom which are provided in correspondence with a trunk pitch axis 5, a trunk roll axis 6, and a trunk yaw axis 7. (Please refer to the foregoing description and FIGS. 3 and 4.)

The legs comprising the lower limbs each include a hip joint yaw axis 16, a hip joint pitch axis 17, a hip joint roll axis 18, a knee joint pitch axis 19, an ankle joint pitch axis 20, an ankle joint roll axis 21, and a foot (or a sole) 22. The points where the hip joint pitch axes 17 and their corresponding hip joint roll axes 18 intersect are defined as the locations of the hip joints of the robot 100 in the embodiment. The feet (or soles) 22 of the human body are actually structures having many joints and degrees of freedom. However, the soles of the legged mobile robot 100 of the embodiment are assumed as having zero degrees of freedom. Therefore, in the embodiment, each leg possesses six degrees of freedom.

To sum up, the total number of degrees of freedom of the legged mobile robot 100 of the embodiment is 3+7×2+3+6×2=32. However, the number of degrees of freedom of an entertainment humanoid robot 100 is not necessarily limited to 32. It is obvious that the number of degrees of freedom, that is, the number of joints can be increased or decreased as necessary in accordance with, for example, the specification requirements and the limiting conditions in designing and manufacturing the robot.

Each degree of freedom of the above-described legged mobile robot 100 is actually provided using an actuator. To respond to the demands of approximating the form of the robot to the natural form of a human being by removing extra bulges from its external appearance, and of controlling the posture of an unstable structure for walking on two feet, it is preferable to use small and light actuators. In the embodiment, there are used in the humanoid robot 100 small AC servo actuators which are directly connected to gears and which incorporate in a motor unit a servo control system formed into a one-chip system. This type of AC servo actuator is disclosed in, for example, Japanese Patent Application No. 11-33386 which has already been assigned to the applicant.

The legged mobile robot 100 having the structure providing the degrees of freedom shown in FIG. 5 is previously assumed to stumble or fall down. The structural parts thereof are disposed so that the robot 100 can be restored, that is, can get up from almost any of its fallen-down postures (please refer to what is described below for details). Therefore, it is preferable that the output torque specification requirements of each movable portion be set taking into consideration the restoring operation from a fallen-down posture.

Figure 6:
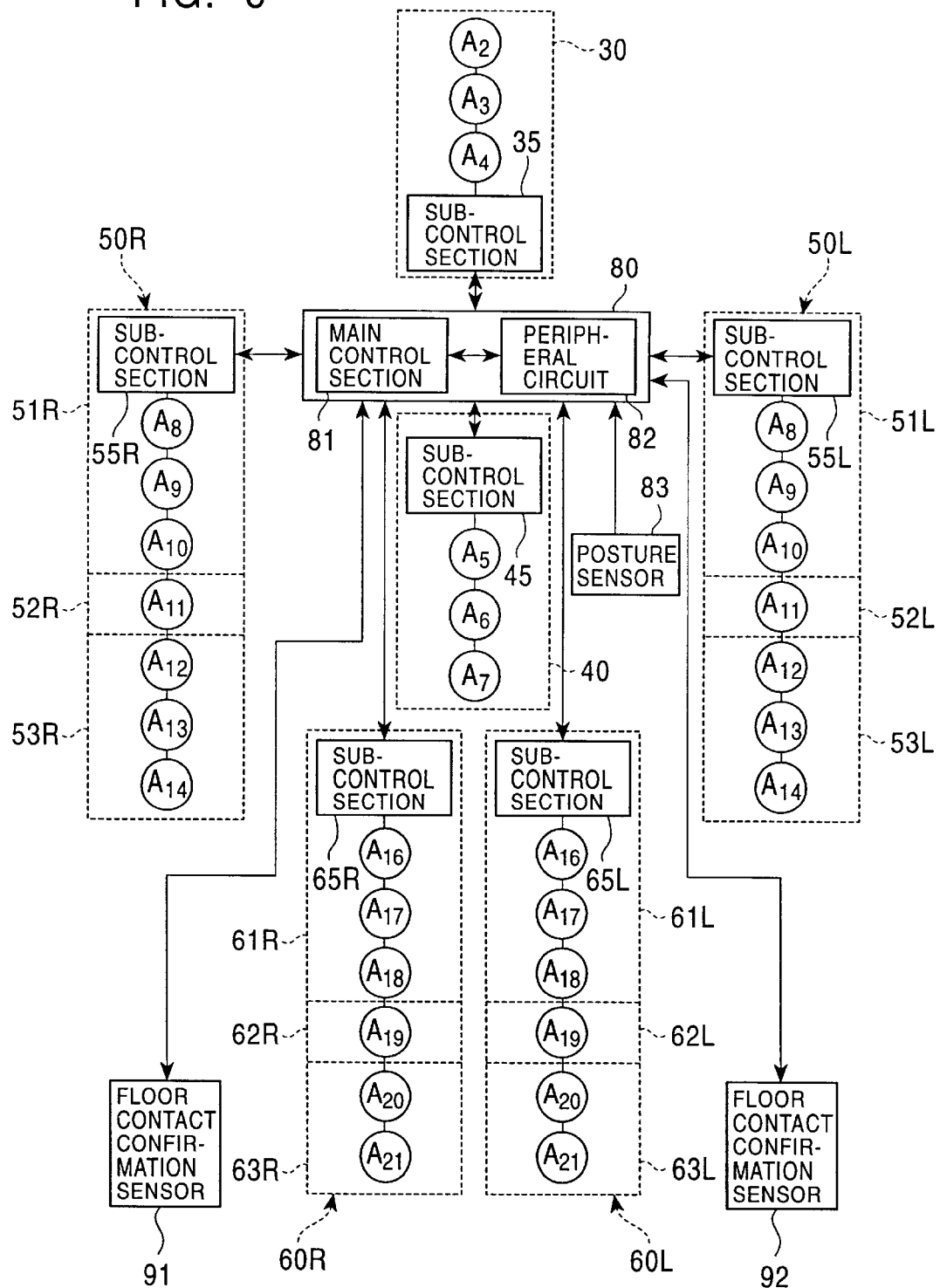
FIG. 6 schematically shows the structure of a controlling system of the embodiment of the legged mobile robot 100.

FIG. 6 is a schematic view of the structure of a controlling system of the humanoid robot 100. As shown in FIG. 6, the legged mobile robot 100 comprises mechanical units 30, 40, 50R/L, and 60R/L, which are formed in correspondence with the four limbs of a human being. The legged mobile robot 100 also comprises a control section 80 for performing a suitable controlling operation in order to achieve harmonious movements between each of the mechanical units. (The R and L in 50R/L and in 60R/L stand for right and left, respectively. This also applies to the R and L appearing in the reference numerals below.)

The movement of the legged mobile robot 100 is generally controlled by the control section 80. The control section 80 comprises a main control section 81 and a peripheral circuit 82. The main control section 81 comprises main circuit components (not shown), such as a central processing unit (CPU) chip and a memory chip. The peripheral circuit 82 includes an interface (not shown) for allowing transfer of data and commands between, for example, a power supply and each of the structural elements of the robot 100.

In the embodiment, the power supply has a structure (not shown in FIG. 4) comprising a battery for independently actuating the legged mobile robot 100. When an independently actuating type is used, the radius of physical movement of the legged mobile robot 100 is not limited by a power supply cable, so that it can walk freely. In addition, when walking or during various other movements such as those of the upper limbs, it is no longer necessary to take into consideration interference with the power supply cable, so that the movements are easily controlled.

Each degree of freedom of the legged mobile robot 100 shown in FIG. 5 is provided using a corresponding actuator. More specifically, the head unit 30 includes a neck joint yaw axis actuator $A_2$, a neck joint pitch axis actuator $A_3$, and a neck joint roll axis actuator $A_4$ disposed in correspondence with the neck joint yaw axis 2, the neck joint pitch axis 3, and the neck joint roll axis 4, respectively.

The trunk unit 40 comprises a trunk pitch axis actuator $A_5$, a trunk roll axis actuator $A_6$, and a trunk yaw axis actuator $A_7$ disposed in correspondence with the trunk pitch axis 5, the trunk roll axis 6, and the trunk yaw axis 7, respectively.

The arm units 50R/L are divided into upper arm units 51R/L, elbow joint units 52R/L, and front arm units 53R/L. Each of the arm units 50R/L includes a shoulder joint pitch axis actuator $A_8$, a shoulder joint roll axis actuator $A_9$, an upper arm yaw axis actuator $A_{10}$, an elbow joint pitch axis actuator $A_{11}$, an elbow joint roll axis actuator $A_{12}$, a wrist joint pitch axis actuator $A_{13}$, and a wrist joint roll axis actuator $A_{14}$ disposed in correspondence with its respective shoulder joint pitch axis 8, its respective shoulder joint roll axis 9, its respective upper arm yaw axis 10, its respective elbow joint pitch axis 11, its respective elbow joint roll axis 12, its respective wrist joint pitch axis 13, and its respective wrist joint roll axis 14.

The leg units 60R/L are divided into thigh units 61R/L, knee units 62R/L, and shin units 63R/L. Each of the leg units 60R/L includes a hip joint yaw axis actuator $A_{16}$, a hip joint pitch axis actuator $A_{17}$, a hip joint roll axis actuator $A_{18}$, a knee joint pitch axis actuator $A_{19}$, an ankle joint pitch axis actuator $A_{20}$, and an ankle joint roll axis actuator $A_{21}$ disposed in correspondence with its respective hip joint yaw axis 16, its respective hip joint pitch axis 17, its respective hip joint roll axis 18, its respective knee joint pitch axis 19, its respective ankle joint pitch axis 20, and its respective ankle joint roll axis 21.

Preferably, each of the actuators $A_2$, $A_3$, . . . is a small AC servo actuator (described above) which is directly connected to gears and which incorporates in a motor unit a servo control system formed into a one-chip system.

Subcontrol sections 35, 45, 55, and 65 for controlling the driving of the corresponding actuators are disposed for the corresponding mechanical units, such as the head unit 30, the trunk unit 40, the arm units 50, and the leg units 60. Floor contact confirmation sensors 91 and 92 for detecting whether or not the soles of the legs 60R and 60L have landed on the floor are installed. A posture sensor 93 for measuring the posture is installed in the trunk unit 40. Using the outputs from the sensors 91 to 93, the period of time during which the soles 22 are on and off the floor, the tilting of the trunk, and the like are detected in order to allow dynamic correction of the controlling target.

The main control section 80 suitably controls the subcontrol sections 35, 45, 55, and 65 in response to outputs from the sensors 91 to 93 in order to allow the upper limbs, the trunk, and the lower limbs of the legged mobile robot 100 to move harmoniously. In accordance with, for example, user commands, the main control section 81 calls out the predetermined operation pattern and sets the movements of the legs, the ZMP (zero moment point) path, the movement of the trunk, the movements of the upper limbs, the height of the waist, etc. Then, it sends commands (that is, command data to be sent to the actuators) for operations in accordance with the aforementioned settings to each of the subcontrol sections 35, 45, 55, and 65. Thereafter, each of the subcontrol sections 35, 45, . . . interprets its corresponding command which it has received from the main control section 81 in order to output a corresponding actuation control signal to each of the actuators $A_2$, $A_3$, . . . .

The ZMP is the point on the floor surface where the moment resulting from the floor reaction force when the robot walks is zero. The ZMP path refers to the path of movement of the ZMP when, for example, the robot 100 is walking.

The legged mobile robot 100 may be an independently actuating type or a remote control type robot. A remote control type robot includes a communications means (such as wireless or wired LAN such as Ethernet) for communications with an external controlling device and a communications interface which are not shown in FIG. 6, and can process the outputs from the sensors and control the actuation operation of each of the actuators $A_2$, $A_3$, . . . by the corresponding command value supplied not from the main control section 80 but from the external controlling device.

Figure 7:
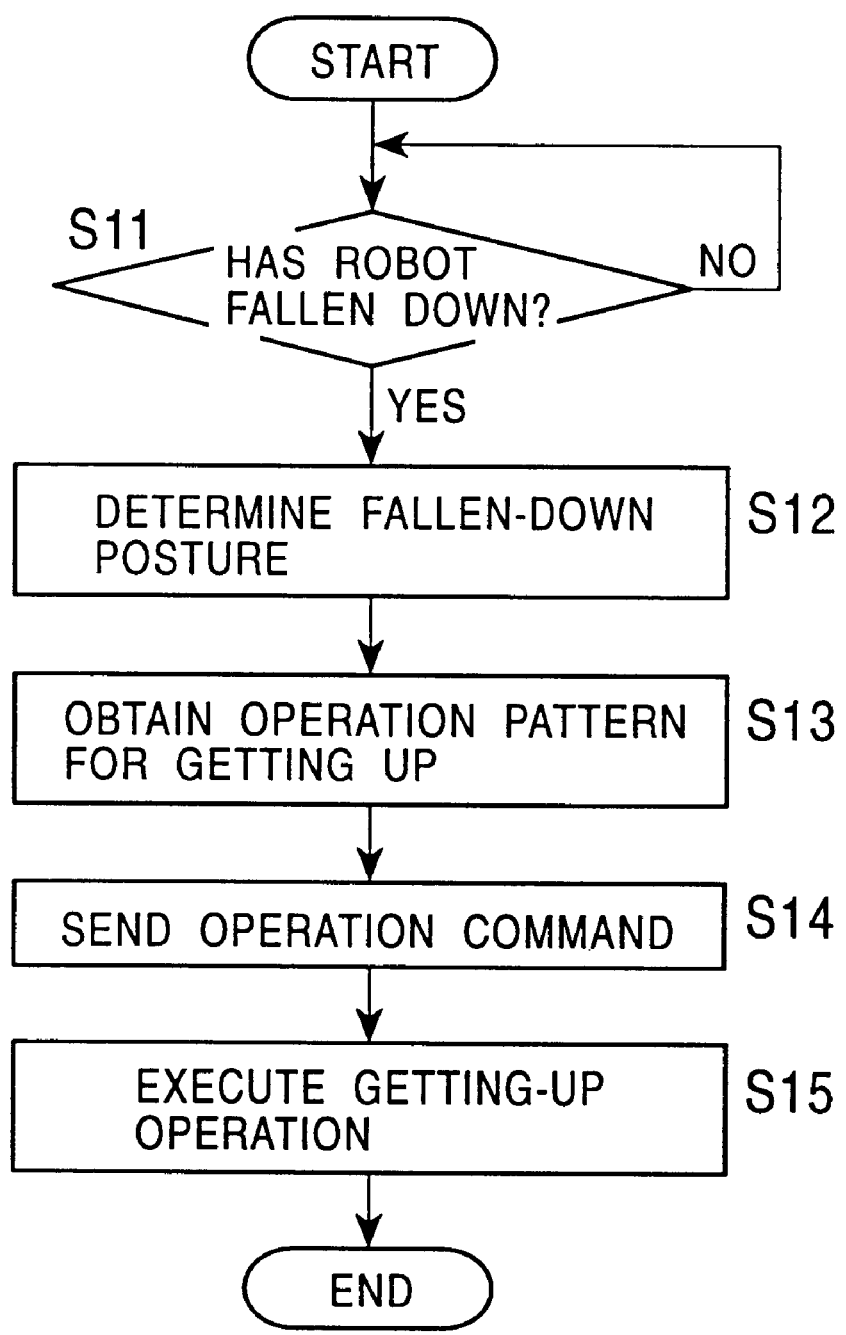
FIG. 7 is a flow chart schematically illustrating the operational procedures which are carried out when the legged mobile robot 100 has fallen down.

A description of the operations and procedures carried out when the legged mobile robot 100 stumbles or falls down will now be described. FIG. 7 schematically shows in flowchart form the operations and procedures carried out when the legged mobile robot 100 stumbles or falls down.

Based on the output of each sensor, such as the posture sensor 93, the main control section 80 detects or determines that the robot 100 is no longer in its usual posture and has fallen down (Step S11). For example, the main control section 80 determines that the robot 100 has fallen down by the difference between the posture which has been measured and the actual posture or by means of the sole setting confirmation sensors 91 and 92.

The general postures which the legged mobile robot 100 takes when it falls down are "lying-on-the-face posture," "lying-on-the-back posture," and "lying sideways posture." The output from the posture sensor 93 allows the direction of the posture sensor mounting portion with respect to the direction of gravitational force to be detected. Along with this, by measuring the displacement angle in correspondence with each degree of freedom at its corresponding joint of the legged mobile robot 100 itself, the posture of the robot 100 when it has fallen down can be determined (Step S12).

When the posture of the robot 100 which has fallen down is determined, the main control section 80 calls out the getting-up operation pattern in accordance with the fallen-down posture such as the "lying-on-the-face posture," the "lying-on-the-back posture," or the "lying sideways posture" or carries out computing operations in order to generate the getting-up operation pattern (Step S13).

Then, in accordance with the obtained getting-up operation pattern, the movement of the feet, the ZMP (zero moment point) path, the movement of the trunk, the movement of the upper limbs, the height of the waist, etc., are set, and commands (that is, command data to be sent to the actuators) for commanding operations in accordance with the details of these settings are sent to the subcontrol sections 35, 45, 55, and 65 (Step S14).

As a result, the actuators $A_2$, $A_3$, . . . are actuated in synchronism in order for the legged mobile robot 100 to move its whole body harmoniously and to get up (Step S15).

Obviously, there are various types of required getting-up operation patterns for the legged mobile robot 100 which has fallen down depending on the fallen-down postures. This point is described in detail later.

When the legged mobile robot 100 is an independently actuating type robot, it is necessary for the main control section 80 to perform all of the following operations, that is, the determination of whether or not the robot 100 has fallen down, the determination of the fallen-down posture, the setting of the getting-up operation pattern, and the controlling of the getting-up operations. On the other hand, when the legged mobile robot 100 is a remote-control-type robot, an external device determines whether or not the robot 100 has fallen down, determines the fallen-down posture, generates the getting-up operation pattern, etc., in order to receive the command values based on these operations through a communications means such as LAN (for example, Ethernet or BlueTooth) for actuating the robot 100.

A description of the operational procedures for causing the legged mobile robot 100 of the embodiment to get up from various fallen-down postures will now be given in detail. It is to be satisfactorily understood that, in the embodiment, by using the movable portion around the pitch axis of the trunk, that is, the actuator $A_5$, the flexible movement of the center of gravity is made possible in order to realize the getting-up operations.

(1) Getting up from the "lying-on-the-face state"

FIGS. 8 to 13 illustrate the series of operations which are carried out to cause the legged mobile robot 100 of the embodiment to get up from its "lying-on-the-face state."

Figure 8:
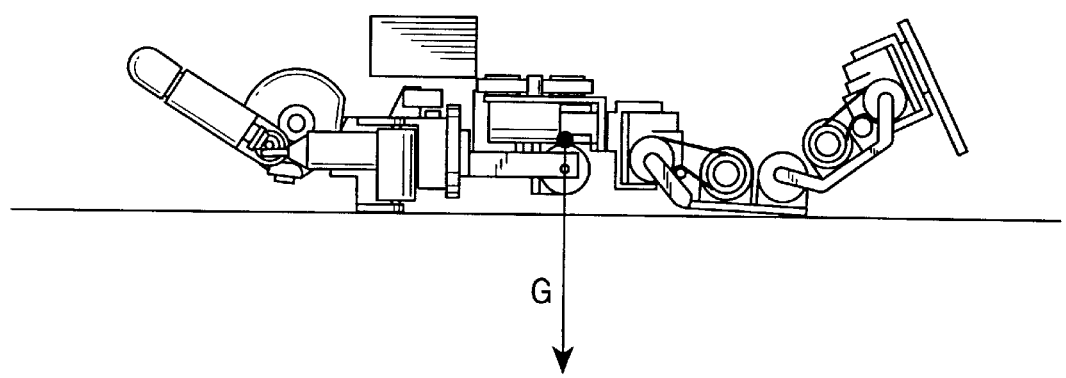
FIG. 8 is used to illustrate a series of operations which are carried out to cause the legged mobile robot 100 to get up from a "lying-on-the-face state." More specifically.

FIG. 8 illustrates a state immediately after the legged mobile robot 100 has fallen on the surface of the floor in the "lying-on-the-face posture." When the robot 100 is in this fallen-down state, the main control section 80 detects or determines that the robot 100 is no longer in its usual posture and has fallen down based on the output of each sensor, such as the posture sensor 93.

Then, by the output from the posture sensor 93, the main control section 80 detects the direction at the posture sensor mounting portion with respect to the direction of the gravitational force, and measures the displacement angle for each degree of freedom which is provided at each joint in order to determine that the legged mobile robot 100 has fallen down and is presently in the "lying-on-the-face posture."

Figure 9:
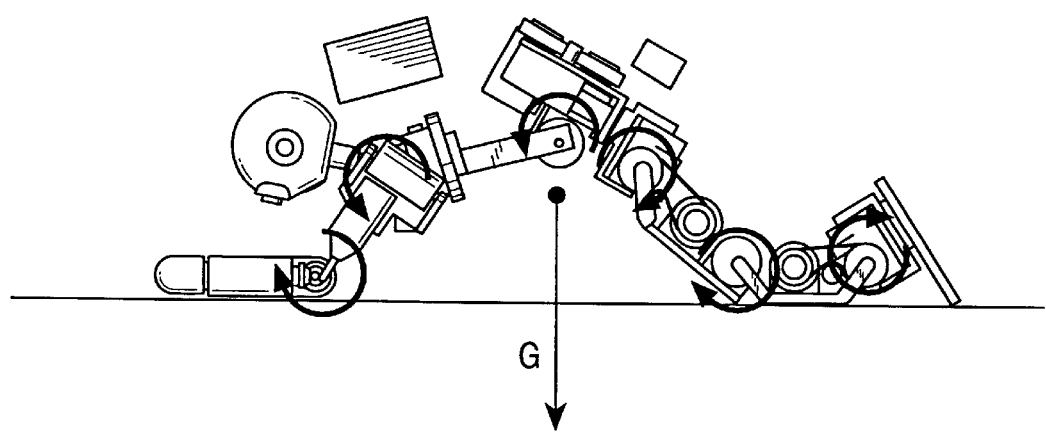
FIG. 9 is used to illustrate the series of operations which are carried out to cause the legged mobile robot 100 to get up from the "lying-on-the-face state." More specifically.

FIG. 9 shows a state in which the legged mobile robot 100 in the "lying-on-the-face posture" is starting to get up.

In the fallen-down state shown in FIG. 8, the center of gravity of the legged mobile robot 100 is at its lowest position near the floor surface. In order for the robot 100 to get up from the fallen-down state and to get restored to its stable upright posture, it is, first, necessary to return the center of gravity to a high position. In the posture shown in FIG. 9, the center of gravity G is moved gradually upward while supporting the whole body with the arms and legs. Here, in the legged mobile robot 100, both shoulder joint pitch axis actuators $A_8$, both elbow joint pitch axis actuators $A_{11}$, the trunk pitch axis actuator $A_5$, the hip joint pitch axis actuators $A_{17}$, the knee pitch axis actuators $A_{19}$, and the ankle joint pitch axis actuators $A_{20}$ are primarily displaced.

Figure 10:
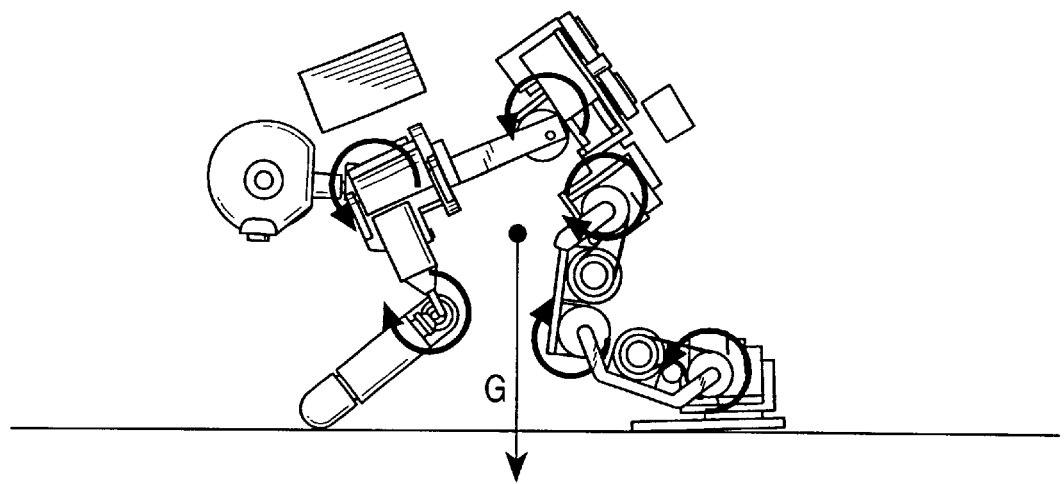
FIG. 10 is used to illustrate the series of operations which are carried out to cause the legged mobile robot 100 to get up from the "lying-on-the-face state." More specifically.

In FIG. 10, both shoulder joint pitch axis actuators $A_8$, both trunk pitch axis actuators $A_5$, and the hip joint pitch axis actuators $A_{17}$ are primarily further displaced in order to raise the position of the center of gravity G further upward. The distances between the portions of the arms that contact the floor and the corresponding portions of the legs that contact the floor are gradually made smaller. In the embodiment shown in this figure, the portions of the arms that contact the floor are the ends thereof (that is, the hands), and the portions of the legs that contact the floor are the feet ends (that is, the toes), but the portions where they contact the floor are not particularly limited thereto.

Figure 11:
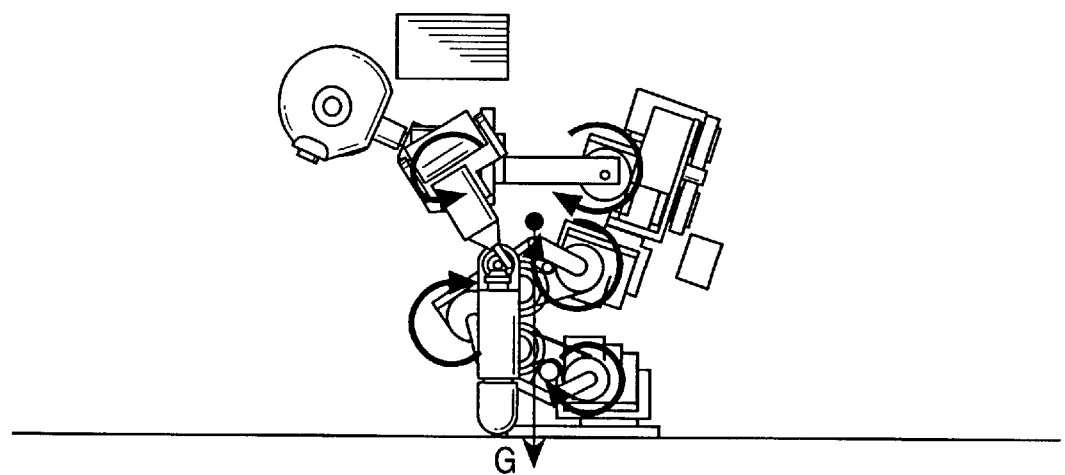
FIG. 11 is used to illustrate the series of operations which are carried out to cause the legged mobile robot 100 to get up from the "lying-on-the-face state." More specifically.

In FIG. 11, the distances between the portions of the arms that contact the floor and the corresponding portions of the legs that contact the floor are made even shorter, causing the center of gravity G to move upwardly of the feet (that is, the stable posture area). Here, only the ends of the arms (that is, the fingers tips) contact the floor, and the portions of the legs which contact the floor switch to the soles of the feet. The robot changes its posture to that shown in FIG. 11 by actuating primarily both shoulder joint pitch axis actuators $A_8$, both elbow joint pitch axis actuators $A_{11}$, the trunk pitch axis actuator $A_5$, both hip joint pitch axis actuators $A_{17}$, and the knee joint pitch axis actuators $A_{19}$. In particular, the trunk pitch axis actuator $A_5$ and the knee joint pitch axis actuator $A_{19}$ are maximally displaced, and the trunk and the knees are bent to the extent possible in order to make the distance between the center of gravity G and the soles of the feet less than the lengths of the arms. This makes is possible to insert both knees between both arms, so that the center of gravity is moved smoothly.

As a result, the ZMP (zero moment point) is completely accommodated in the area where the feet contact the floor, making it possible to move the arms off the floor surface. In the example described in the "Technical Field of the Invention" section, the trunk of the robot does not possess degrees of freedom, so that it is difficult to move the ZMP to the area where the feet contact the floor when the robot takes a posture in which the arms and feet contact the floor. In the embodiment, the trunk possesses a degree of freedom at the pitch axis, so that it can take the posture shown in FIG. 11.

Figure 12:
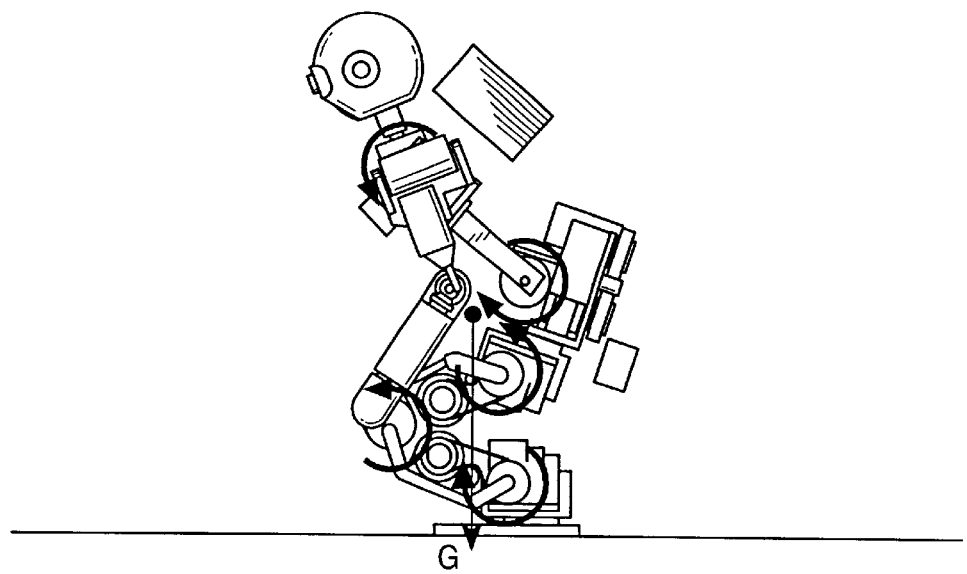
FIG. 12 is used to illustrate the series of operations which are carried out to cause the legged mobile robot 100 to get up from the "lying-on-the-face state." More specifically.

FIG. 12 shows a state in which the center of gravity G is moved still further upward by moving the ends of the arms off the surface of the floor, and by extending the legs as a result of actuating both knee pitch axis actuators $A_{19}$. The trunk pitch axis actuator $A_5$, both hip joint pitch axis actuators $A_{17}$, both knee pitch axis actuators $A_{19}$, and the ankle pitch axis actuators $A_{20}$ are primarily displaced.

Figure 13:
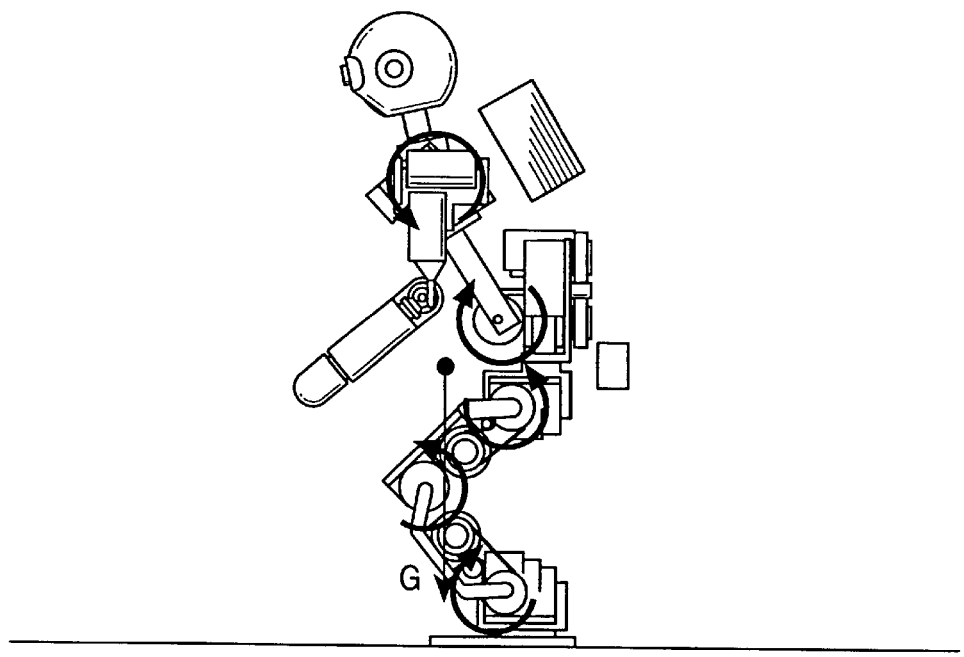
FIG. 13 is used to illustrate the series of operations which are carried out to cause the legged mobile robot 100 to get up from the "lying-on-the-face state." More specifically.

FIG. 13 shows a state in which the robot is nearing its upright posture as a result of still further moving the center of gravity G upward. The trunk pitch axis actuator $A_5$, both hip joint pitch axis actuators $A_{17}$, both knee joint pitch axis actuators $A_{19}$, and both ankle joint pitch axis actuators $A_{20}$ are primarily displaced.

As illustrated in FIGS. 8 to 13, the legged mobile robot 100 of the embodiment can independently get from the "lying-on-the-face posture" (without any physical help from the outside). It should be sufficiently appreciated that the displacement of the trunk pitch axis during the getting-up operation is an important factor.

(2) Getting up from the "lying-on-the-back state"

FIGS. 14 to 20 illustrate the series of operations which are carried out to cause the legged mobile robot 100 of the embodiment to get up from the "lying-on-the-back state."

Figure 14:
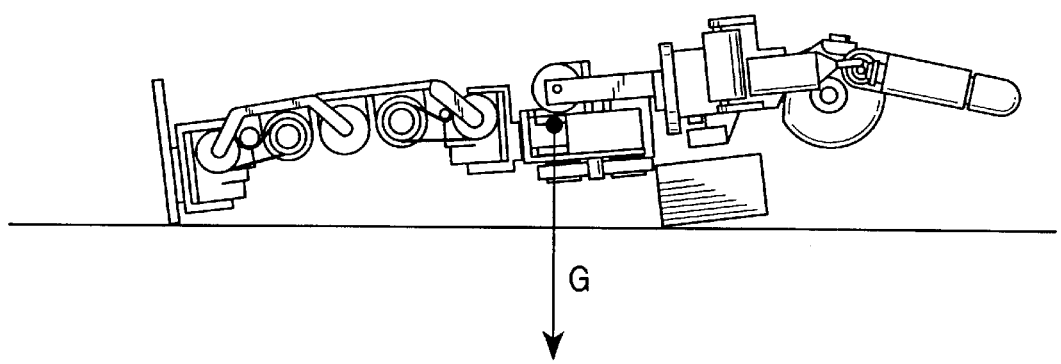
FIG. 14 is used to illustrate a series of operations which are carried out to cause the legged mobile robot 100 to get up from a "lying-on-the-back state." More specifically.

FIG. 14 shows a state immediately after the legged mobile robot 100 has fallen on the surface of the floor in the "lying-on-the-back posture." In this fallen-down state, the main control section 80 detects or determines that the robot 100 is no longer in its usual posture and has fallen down based on the output from each sensor, such as the posture sensor 93.

Figure 15:
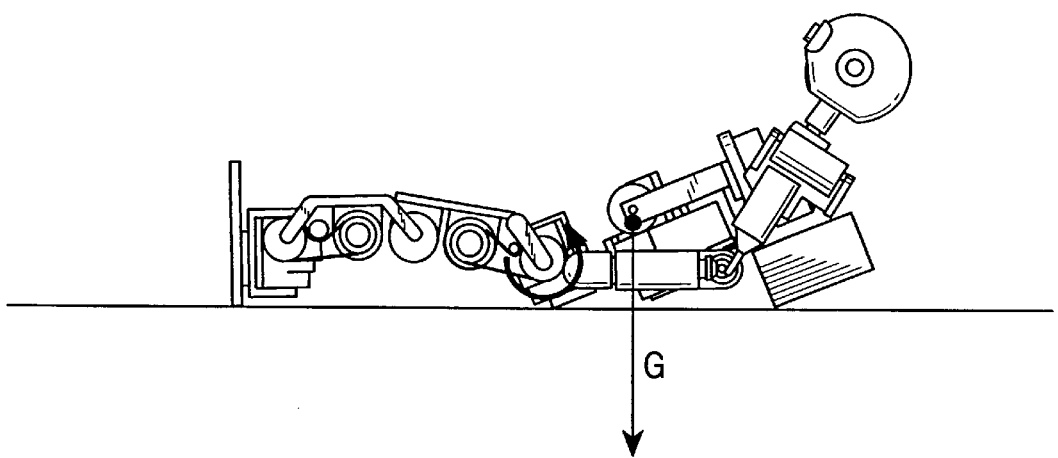
FIG. 15 is used to illustrate the series of operations which are carried out to cause the legged mobile robot 100 to get up from the "lying-on-the-back state." More specifically.

FIG. 15 shows a state in which the legged mobile robot 100 whose fallen-down posture has been determined starts to get up from its "lying-on-the-back posture" after it has fallen down. More specifically, primarily, both hip joint pitch axis actuators $A_{17}$ are displaced in order to relatively raise the upper part of the body and to cause the robot to take a posture in which its waist contacts the floor. Both shoulder joint pitch axis actuators $A_8$ are also actuated in order to prepare both arms to come into contact with the floor.

Figure 16:
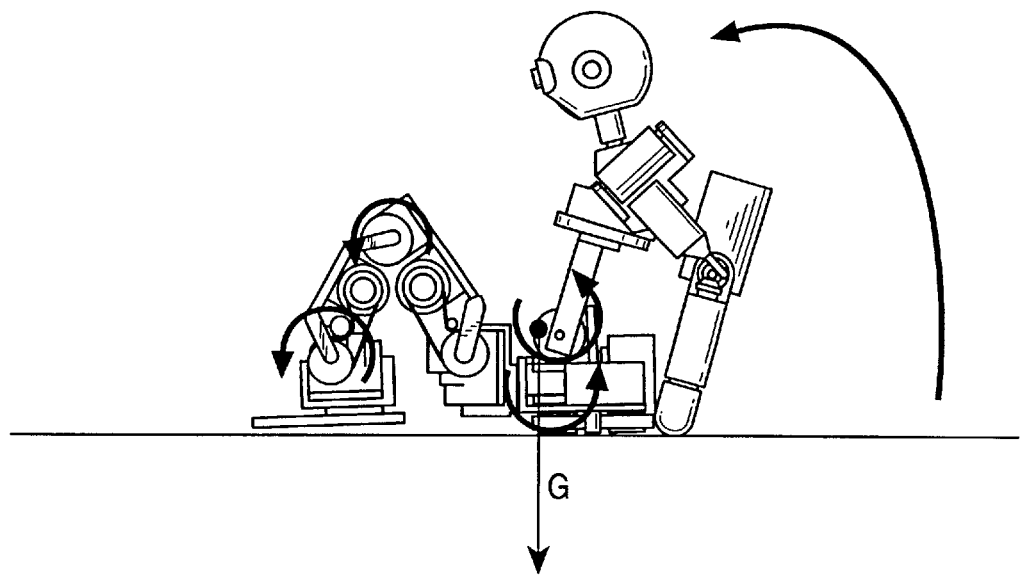
FIG. 16 is used to illustrate the series of operations which are carried out to cause the legged mobile robot 100 to get up from the "lying-on-the-back state." More specifically.

FIG. 16 shows a state in which the legs are further displaced while the waist is in contact with the floor. More specifically, both hip joint pitch axis actuators $A_{17}$, both knee pitch axis actuators $A_{19}$, and both ankle pitch axis actuators $A_{20}$ are moved to prepare the robot to take the posture where the soles of both feet contact the floor.

Figure 17:
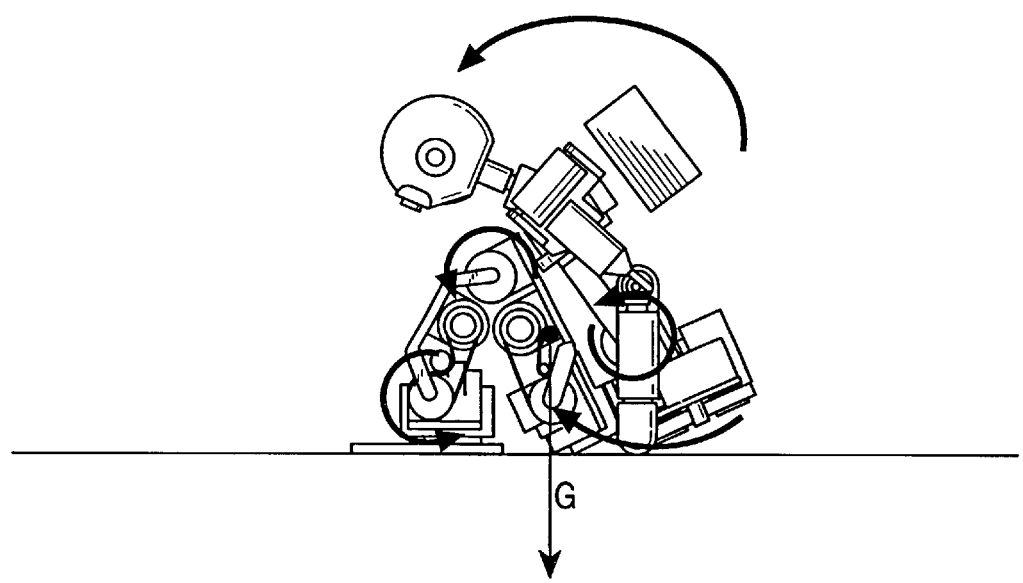
FIG. 17 is used to illustrate the series of operations which are carried out to cause the legged mobile robot 100 to get up from the "lying-on-the-back state." More specifically.

In FIG. 17, the trunk pitch axis actuator $A_5$ is further displaced, and, at the same time, the distances between the portions of the arms which contact the floor and the corresponding portions of the legs which contact the floor are made smaller. This causes the center of gravity G of the legged mobile robot to start moving upward, and the ZMP to start moving gradually towards the legs.

Figure 18:
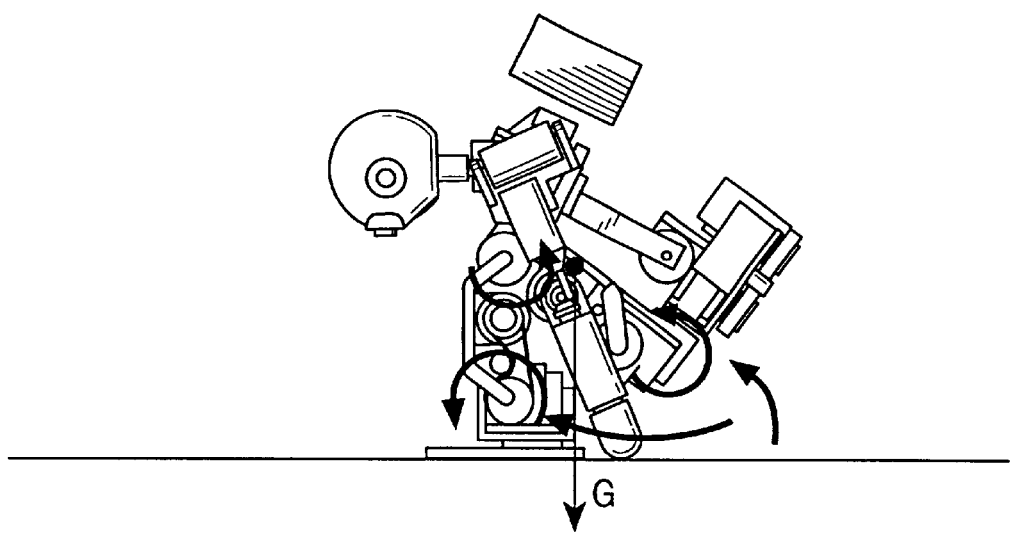
FIG. 18 is used to illustrate the series of operations which are carried out to cause the legged mobile robot 100 to get up from the "lying-on-the-back state." More specifically.

In FIG. 18, the ZMP is moved towards the feet by further decreasing the distances between the portions of the arms which contact the floor and the corresponding portions of the legs which contact the floor. Both knee joint pitch axis actuators $A_{19}$ are further actuated to move the center of gravity G upward. Accordingly, since the ZMP moves into the area where the soles contact the floor, the arms and waist can be moved off the surface of the floor.

According to the legged mobile robot 100 of the embodiment, the ZMP can be moved towards the feet and into the area where the soles contact the floor by causing the trunk to be bent maximally and to assume a forwardly bent posture. It is to be sufficiently appreciated that the arms and waist can be moved off the floor by using the movable portion around the trunk pitch axis actuator $A_5$.

Figure 19:
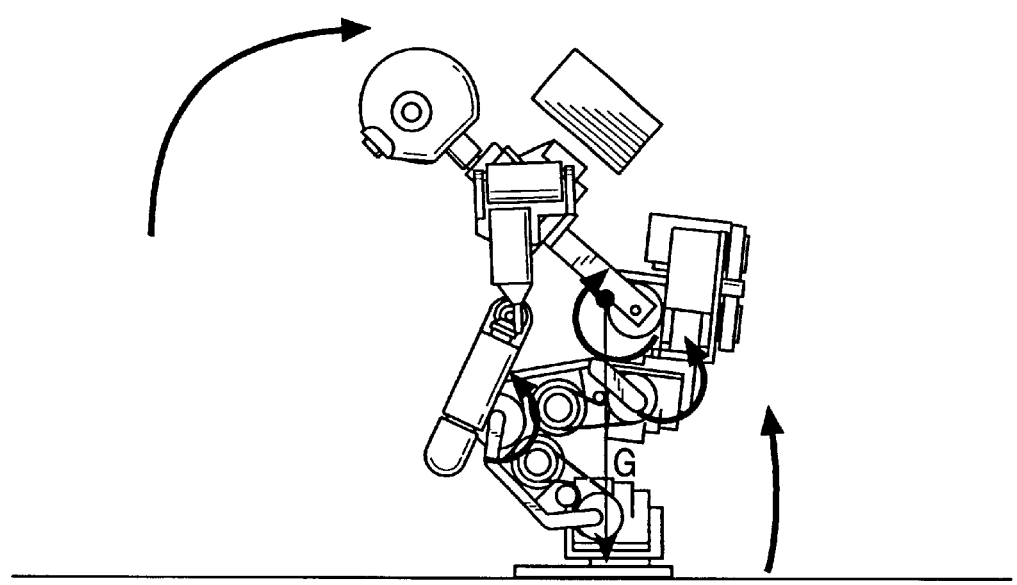
FIG. 19 is used to illustrate the series of operations which are carried out to cause the legged mobile robot 100 to get up from the "lying-on-the-back state." More specifically.

In FIG. 19, after the arms are moved off the floor, the center of gravity G is moved further upward by making the robot assume an extended posture. Here, primarily, both ankle joint pitch axis actuators $A_{20}$, both knee joint pitch axis actuators $A_{19}$, both hip joint pitch axis actuators $A_{17}$, and the trunk joint pitch axis actuator $A_5$ are actuated.

Figure 20:
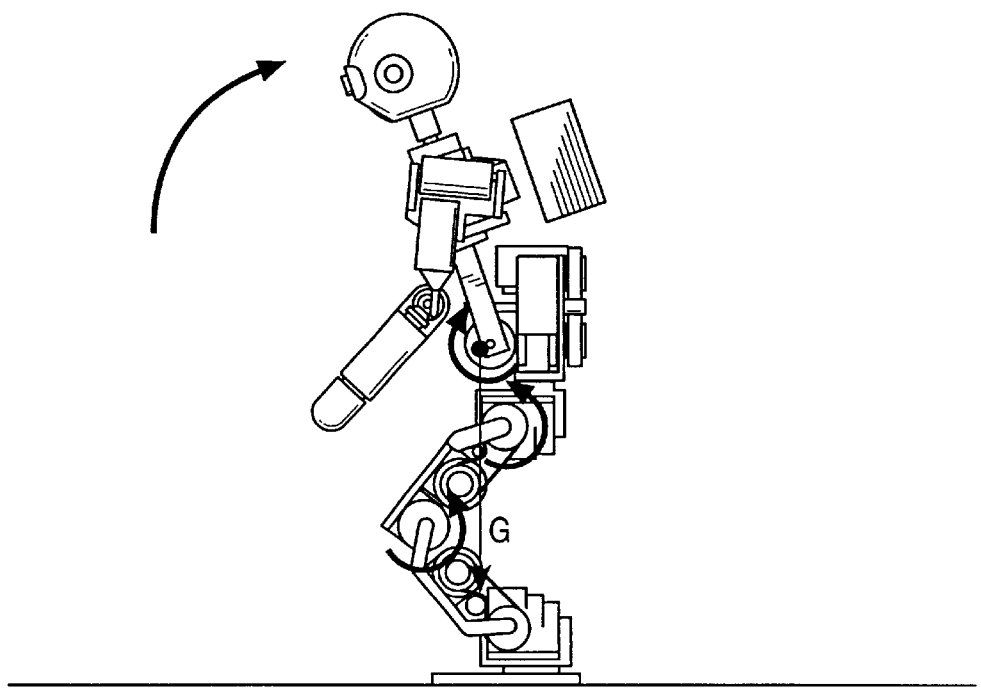
FIG. 20 is used to illustrate the series of operations which are carried out to cause the legged mobile robot 100 to get up from the "lying-on-the-back state." More specifically.

FIG. 20 shows a state in which the robot is nearing the upright posture as a result of moving the center of gravity G upward by further extending the legs. Primarily, the trunk pitch axis actuator $A_5$, both hip joint pitch axis actuators $A_{17}$, both knee joint pitch axis actuators $A_{19}$, and both ankle joint pitch axis actuators $A_{20}$ are displaced.

The "lying-on-the-back posture" is generally one of the fallen-down states from which the legged mobile robot cannot easily get up. The legged mobile robot 100 of the embodiment can smoothly get up in accordance with the pattern of the series of operations illustrated in FIGS. 15 to 20 by using the movable portion around the trunk pitch axis. In other words, by providing more than one degree of freedom at the trunk to allow movement, the getting-up operations from the fallen-down state can be easily performed.

For the getting-up operations from the "lying-on-the-back posture," an operation pattern for causing the robot to get up after being placed on its side may be utilized in addition to the above-described operation pattern for causing the robot to get up in the direction of the front side of the body. The former operation pattern will be described in detail later.

(3) Getting up from the "lying sideways posture"

Even if it is difficult for the legged mobile robot 100 to directly get up from the "lying sideways posture," it is possible to restore the robot to its upright posture from its fallen-down state in accordance with, for example, either one of the aforementioned operation patterns as a result of temporarily changing the "lying sideways posture" of the robot to a posture from which the robot can get up, such as the "lying-on-the-face posture" or "lying-on-the-back posture." Here, the operational procedure for independently changing the posture of the robot from the "lying sideways posture" to the "lying-on-the-face posture" will be described. In the specification, it is to be understood that the "lying sideways posture" is a horizontally symmetrical posture on the left and right sides. (This applies to what follows below.)

FIGS. 21 to 26 illustrate an example of an operation pattern for causing the legged mobile robot 100 of the embodiment to get up from its "lying sideways posture." This getting-up operation pattern basically changes the "fallen-down posture" to the "lying-on-the-face state" by using the movable portion around the trunk yaw axis.

Figure 21:
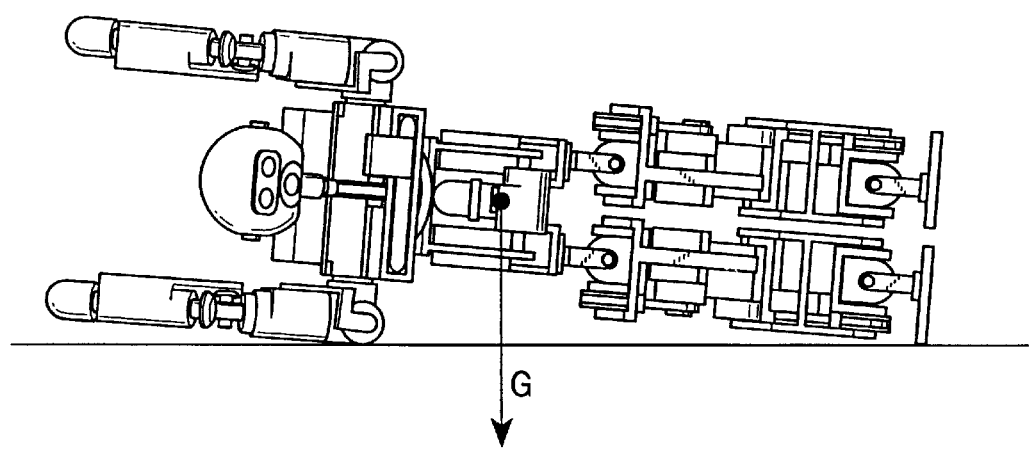
FIG. 21 is used to illustrate an example of an operation pattern for causing the legged mobile robot 100 to get up from a "lying sideways state." More specifically.

FIG. 21 shows a state immediately after the legged mobile robot 100 has fallen on the surface of the floor in the "lying sideways posture." In this fallen-down state, the main control section 80 detects or determines that the robot is no longer in its usual posture and has fallen down.

Figure 22:
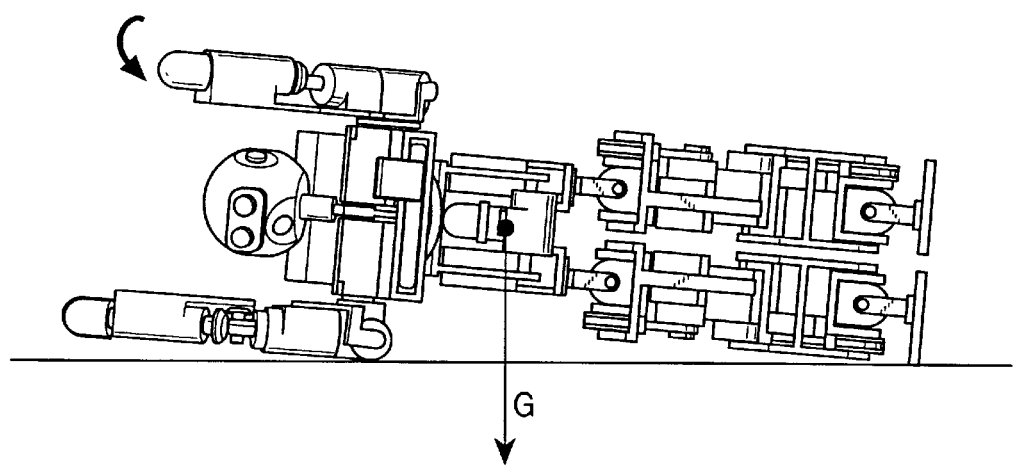
FIG. 22 is used to illustrate the example of the operation pattern for causing the legged mobile robot 100 to get up from the "lying sideways state." More specifically.

FIG. 22 shows a state in which the execution of the operation pattern is started in order to change the posture of the legged mobile robot 100 after determining that it is in the "lying sideways posture" to the "lying-on-the-face posture." More specifically, the left shoulder joint pitch axis actuator $A_8$ and the like are displaced in order to attempt to displace the center of gravity G as a result of moving the left arm towards the front side of the body.

Figure 23:
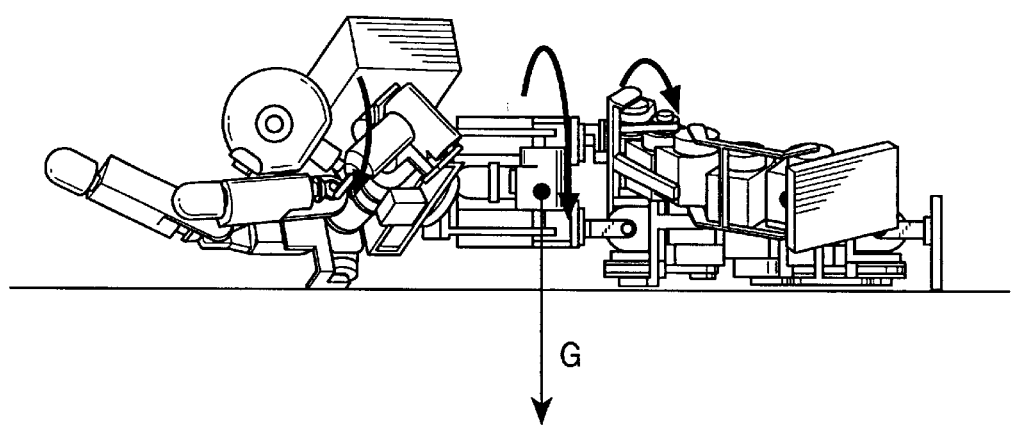
FIG. 23 is used to illustrate the example of the operation pattern for causing the legged mobile robot 100 to get up from the "lying sideways state." More specifically.

In FIG. 23, the upper part of the body is nearing the "lying-on-the-face posture" by rotating the trunk yaw axis actuator $A_7$. At the same time, the left hip joint pitch axis actuator $A_{17}$ is displaced in order to move the whole left arm towards the front side of the body, thereby moving the center of gravity G towards the front side of the plane of the figure.

Figure 24:
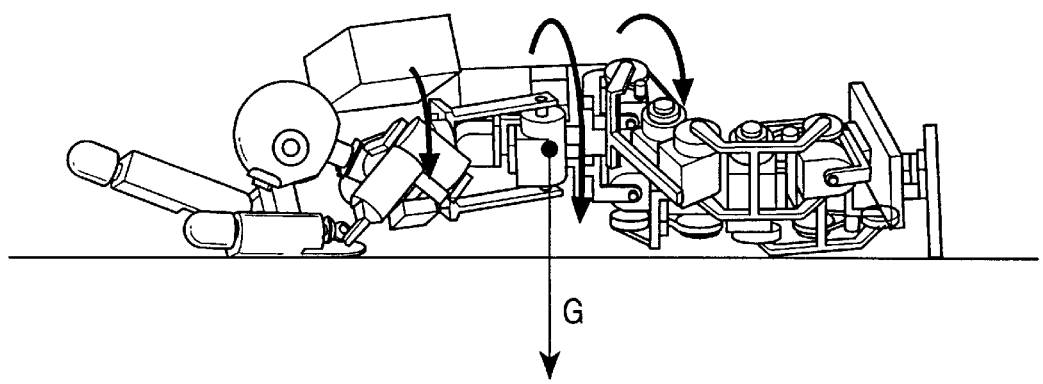
FIG. 24 is used to illustrate the example of the operation pattern for causing the legged mobile robot 100 to get up from the "lying sideways state." More specifically.

In FIG. 24, the left arm comes into contact with the floor so that the robot further nears the "lying-on-the-face posture" as a result of continuing the rotation of the trunk yaw axis actuator $A_7$ and the left hip joint pitch axis actuator $A_{17}$.

Figure 25:
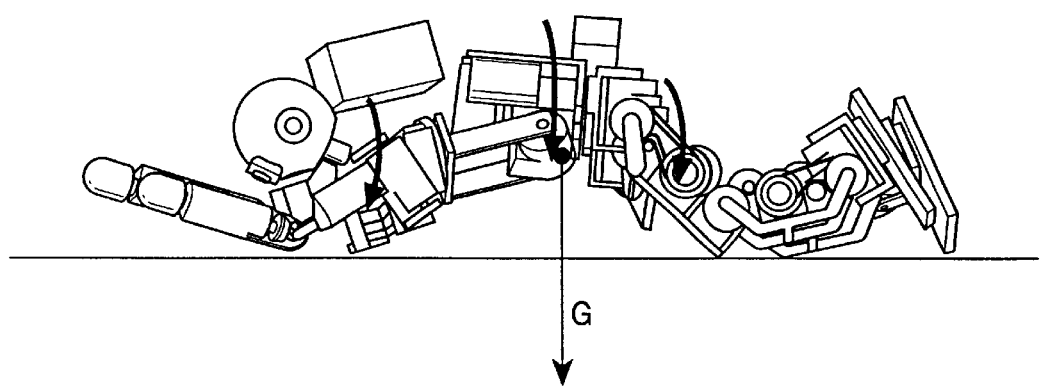
FIG. 25 is used to illustrate the example of the operation pattern for causing the legged mobile robot 100 to get up from the "lying sideways state." More specifically.

In FIG. 25, the center of gravity G loses stability as a result continuing the rotation of the trunk yaw axis actuator $A_7$ and the left hip joint pitch axis actuator $A_{17}$. Therefore, the whole body of the legged mobile robot 100 falls towards the front side of the plane of the figure, and the left arm comes into contact with the floor. The changing of the posture of the upper part of the body to the "lying-on-the-face posture" has progressed considerably.

Figure 26:
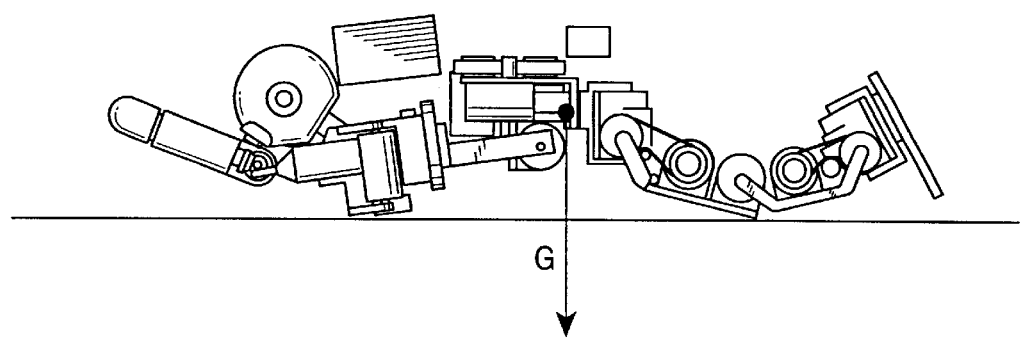
FIG. 26 is used to illustrate the example of the operation pattern for causing the legged mobile robot 100 to get up from the "lying sideways state." More specifically.

In FIG. 26, the posture of the legged mobile robot 100 has been completely changed to the "lying-on-the-face posture" as a result of continuing the rotation of the trunk yaw axis actuator $A_7$ and the left hip joint pitch axis actuator $A_{17}$. From this posture, the legged mobile robot 100 can independently get up (without physical help from the outside) in accordance with, for example, the operation pattern which has already been illustrated in FIGS. 8 to 13.

In the example illustrated in FIGS. 21 to 26, the operation pattern which causes the posture to change to the "lying-on-the-face posture" by primarily making use of the actuation of the trunk yaw axis actuator $A_7$ has been described. Changes between postures can be more smoothly carried out using other operation patterns such as that further making use of the actuation of the trunk roll axis actuator $A_6$ (that is, the displacement of the trunk roll axis in front of the trunk yaw axis). The operation pattern which changes the posture of the robot from the "lying sideways posture" to the "lying-on-the-face posture" using the trunk roll axis actuator $A_6$ and the trunk yaw axis actuator $A_7$ at the same time will be described with reference to FIGS. 27 and 28.

Figure 27:
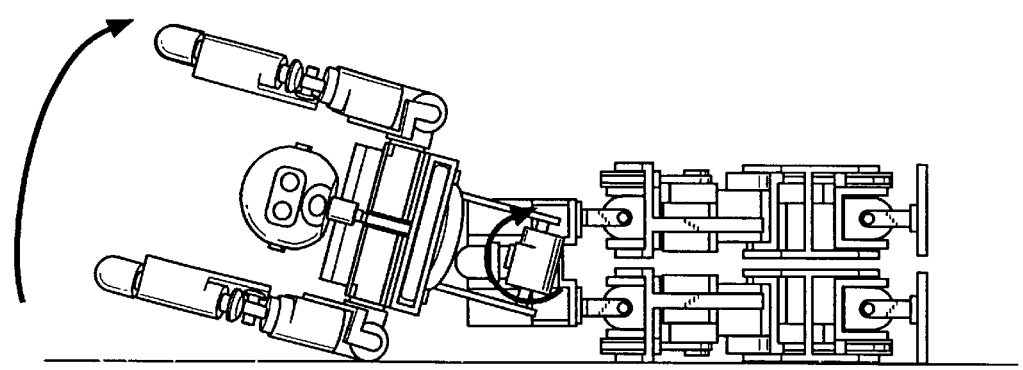
FIG. 27 is used to illustrate an example of an operation pattern for causing the legged mobile robot 100 to get up from the "lying sideways state." More specifically.

In FIG. 27, the robot is placed in a posture in which only a leg contacts the floor as a result of the rotation of the trunk roll axis. In this posture, the upper part of the body can move off the floor by reducing the reaction force which is produced when the right shoulder contacts the floor.

Figure 28:
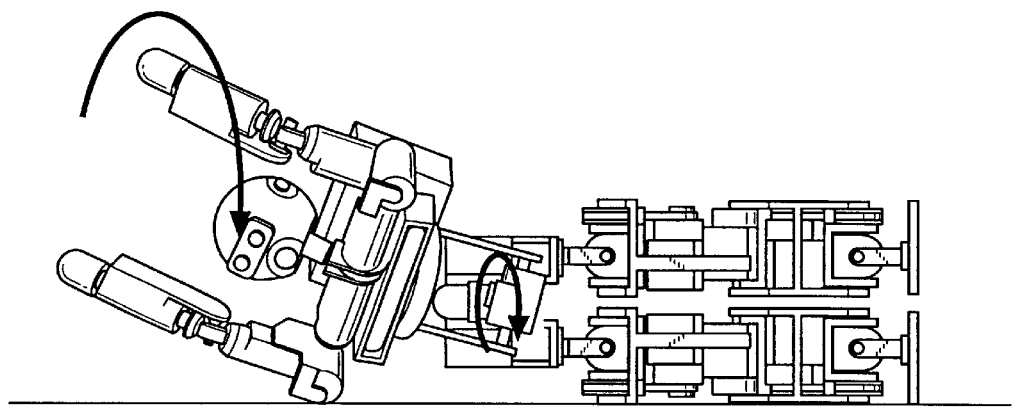
FIG. 28 is used to illustrate the example of the operation pattern for causing the legged mobile robot 100 to get up from the "lying sideways state." More specifically.

In FIG. 28, the trunk yaw axis actuator $A_7$ is rotated. Since the trunk roll axis actuator $A_6$ has already been displaced, the torque required to actuate the trunk yaw axis actuator $A_7$ is reduced. In addition, the change in the posture of the whole legged mobile robot 100 is reduced. As a result, it is possible to save energy, that is, to save the capacity of the battery, required when the posture of the robot changes from the "lying sideways posture" to the "lying-on-the-face posture."

By using two operation patterns which are described above, it is possible to change the posture of the legged mobile robot 100 from the "lying sideways posture" to the "lying-on-the-face posture." When the posture of the robot is temporarily changed to the "lying-on-the-face posture" shown in FIG. 8, the legged mobile robot 100 can independently be restored to its upright posture (without any physical help) in accordance with the pattern of the series of getting-up operations shown in FIGS. 9 to 13, as described above.

If the robot is in a state in which it can freely move, for example, if its arms and feet can freely move, a high-speed movement can be generated around the trunk yaw axis using the reaction force of the resultant force of the movements. However, when one thinks of general fallen-down states of the legged mobile robot, methods which make use of a bounding force provide poor reliability, and it is difficult to control the speed of movement, which may adversely affect the surrounding environment and the maintenance of the robot itself. Taking into consideration that the robot is no longer in its normal posture and has fallen down, it is preferable that the operation pattern be such that the speed of movement is low but that changes between postures be reliably carried out.

(4) Getting up from the "lying-on-the-back posture"

FIGS. 29 to 34 illustrate another example of getting-up operations which cause the legged mobile robot 100 of the embodiment to get up from the "lying-on-the-back posture." In the above-described example which has been described with reference to FIGS. 14 to 20, the operation pattern for causing the legged mobile robot 100 to get up in the direction of the front side of the body has been introduced. Here, the operation pattern for causing the robot to get up after the posture of the robot has been changed from the "lying-on-the-back posture" to another posture by moving sideways once will be described.

Figure 29:
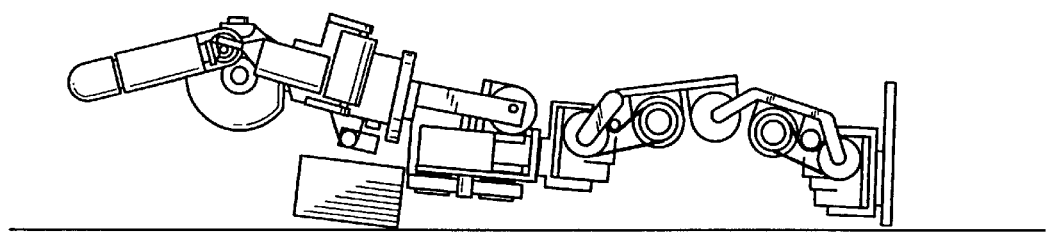
FIG. 29 is used to illustrate another example of an operation pattern for causing the legged mobile robot 100 to get up from the "lying-on-the-back state." More specifically.

FIG. 29 shows a state immediately after the legged mobile robot 100 has fallen on the surface of the floor in the "lying-on-the-back posture." In this fallen-down state, the main control section 80 detects or determines that the robot is no longer in its usual posture and has fallen down, based on the output of each sensor, such as the posture sensor 93. In this example, an operation pattern for causing the posture of the robot to be changed to the "lying sideways posture" once, and, then, to the "lying-on-the-face posture" is selected.

Figure 30:
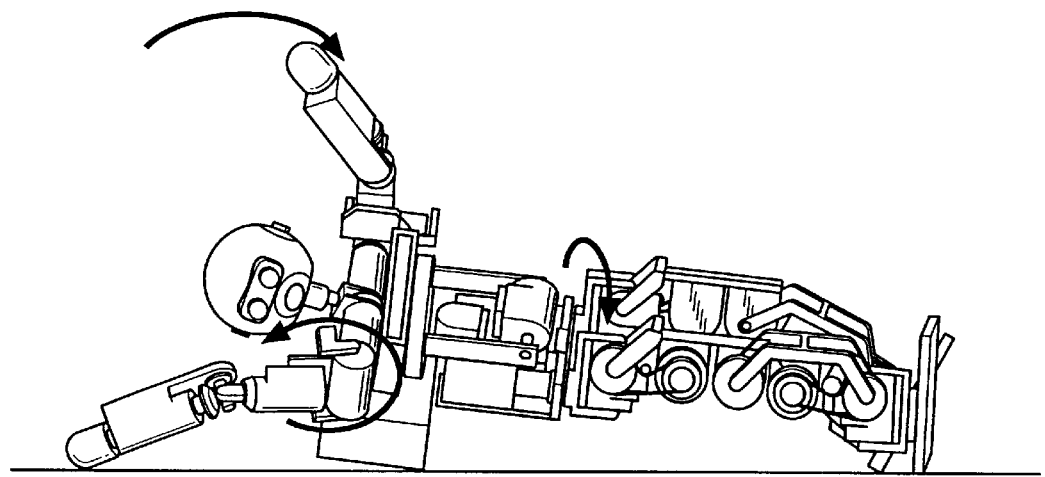
FIG. 30 is used to illustrate the example of the operation pattern for causing the legged mobile robot 100 to get up from the "lying-on-the-back state." More specifically.

In FIG. 30, the upper part of the body is relatively twisted in the desired direction of rotation by rotating both hip joint yaw axis actuators $A_{16}$ while both feet and the back are in contact with the floor. At the same time, by rotating the right shoulder joint pitch axis actuator $A_8$, interference between the upper part of the body and the surface of the floor is prevented from occurring. In addition, by rotating the left shoulder joint pitch axis actuator $A_8$, the movement of the center of gravity towards the twisting direction is facilitated.

Figure 31:
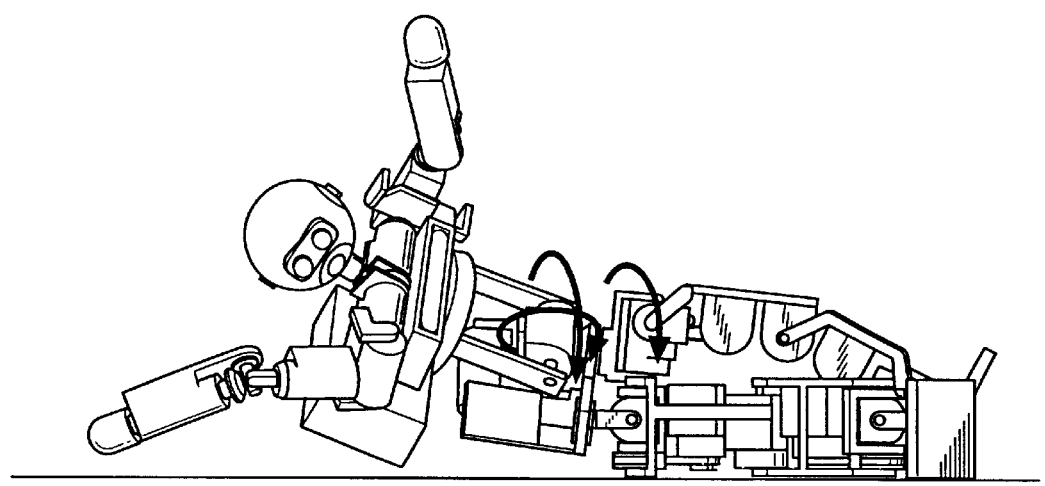
FIG. 31 is used to illustrate the example of the operation pattern for causing the legged mobile robot 100 to get up from the "lying-on-the-back state." More specifically.

In FIG. 31, the whole right leg is further rotated in the twisting direction as a result of rotating the right hip joint yaw axis actuator $A_{16}$ while the left foot is in contact with the floor. At the same time, the left shoulder joint pitch axis actuator $A_8$ and the trunk yaw axis actuator $A_7$ are rotated in order to move the center of gravity in a predetermined direction.

Figure 32:
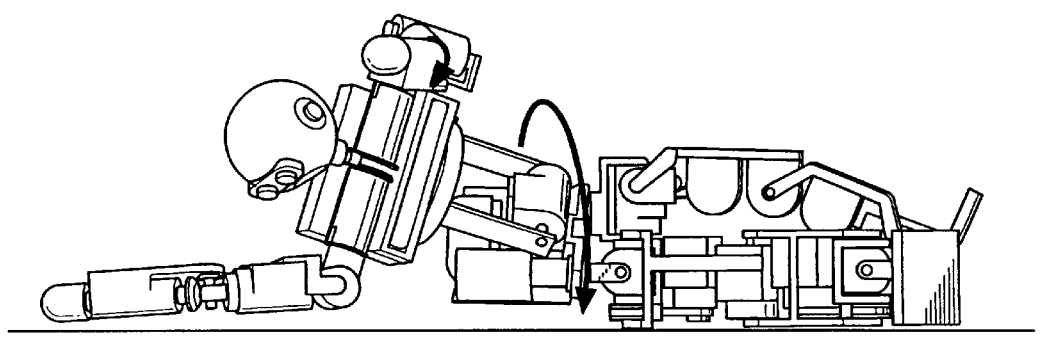
FIG. 32 is used to illustrate the example of the operation pattern for causing the legged mobile robot 100 to get up from the "lying-on-the-back state." More specifically.

In FIG. 32, the trunk yaw axis actuator $A_7$ is further rotated in order to substantially complete the rotation of the upper part of the body, and, at the same time, to ensure that the right arm is in contact with the floor.

Figure 33:
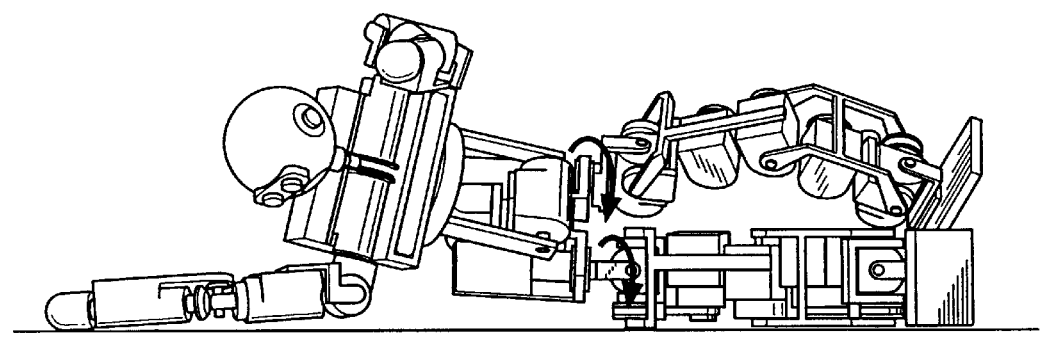
FIG. 33 is used to illustrate the example of the operation pattern for causing the legged mobile robot 100 to get up from the "lying-on-the-back state." More specifically.

In FIG. 33, primarily the right hip joint yaw axis actuator $A_{16}$ is rotated in order to twist the waist in a predetermined direction of rotation for smoother twisting movement.

Figure 34:
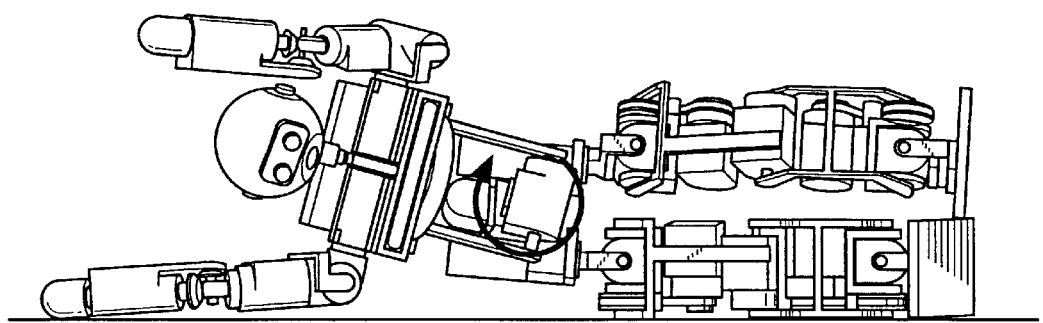
FIG. 34 is used to illustrate the example of the operation pattern for causing the legged mobile robot 100 to get up from the "lying-on-the-back state." More specifically.
Figure 36:
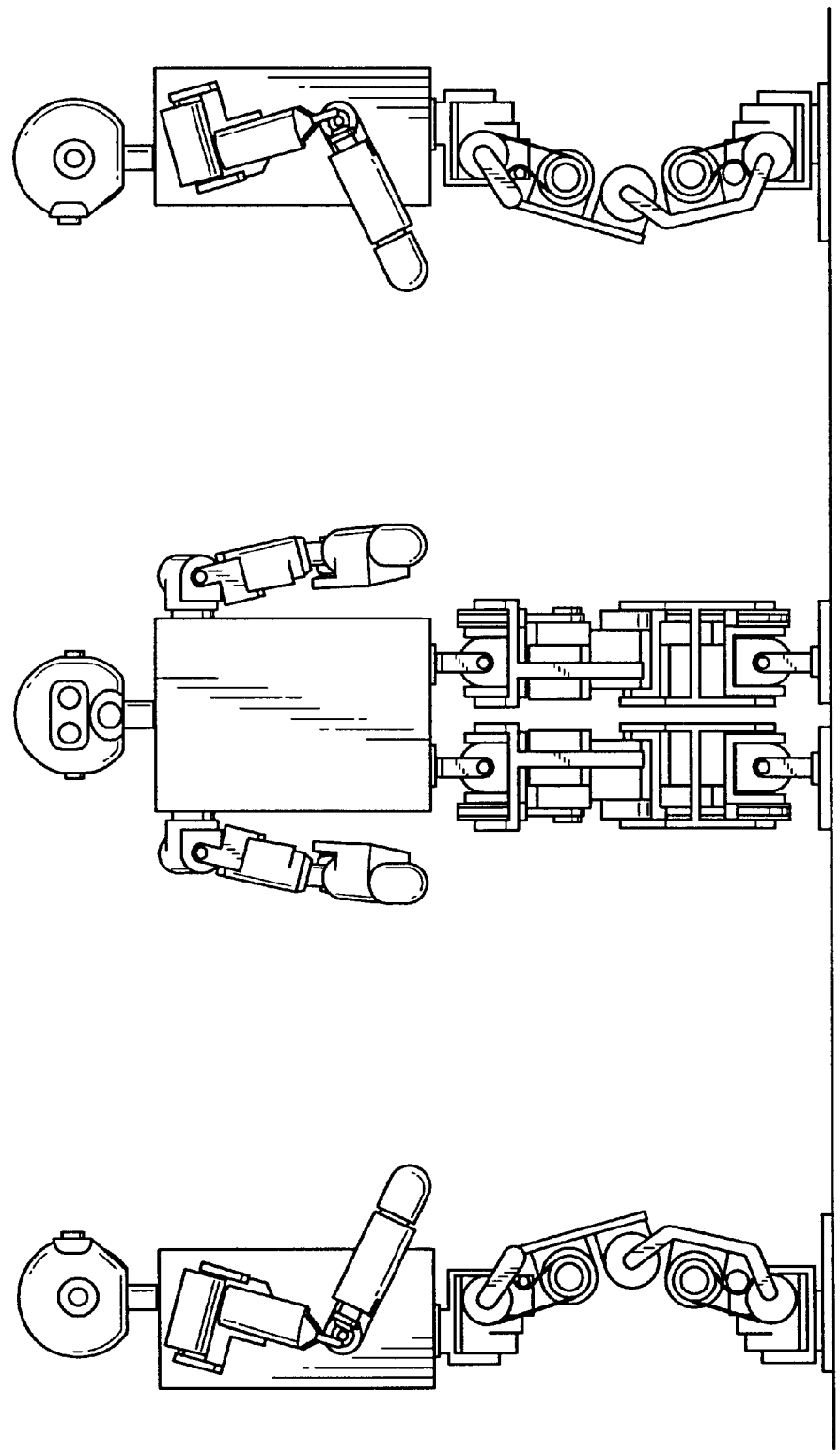
FIG. 36 illustrates a state in which the legged mobile robot shown in FIG. 35 is standing in an upright posture (conventional example).
Figure 37:
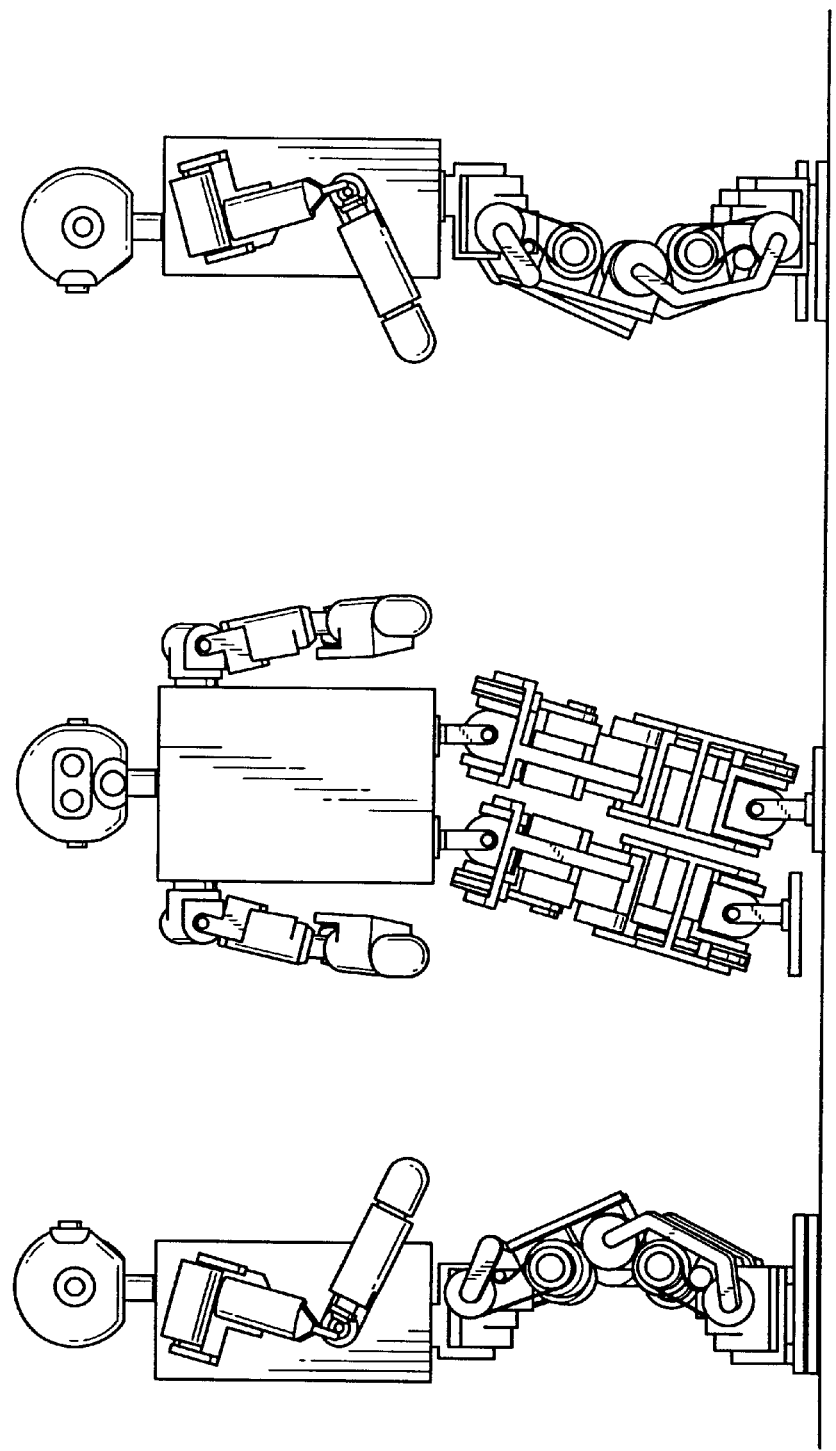
FIG. 37 illustrates a state in which the legged mobile robot shown in FIG. 35 is walking (conventional example). More specifically.
Figure 38:
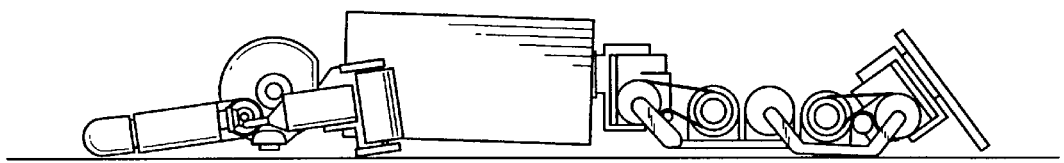
FIG. 38 illustrates a state in which the legged mobile robot shown in FIG. 35 has fallen down in the "lying-on-the-face state" (conventional example).
Figure 39:
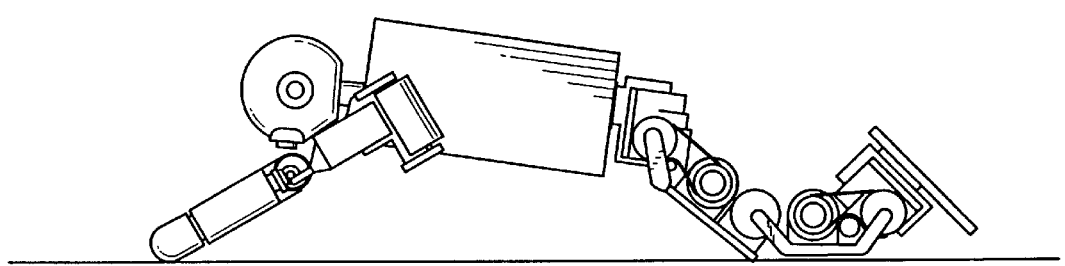
FIG. 39 illustrates an operation pattern for causing the legged mobile robot shown in FIG. 35 to get up from the "lying-on-the-face posture" when it has fallen down. More specifically.
Figure 40:
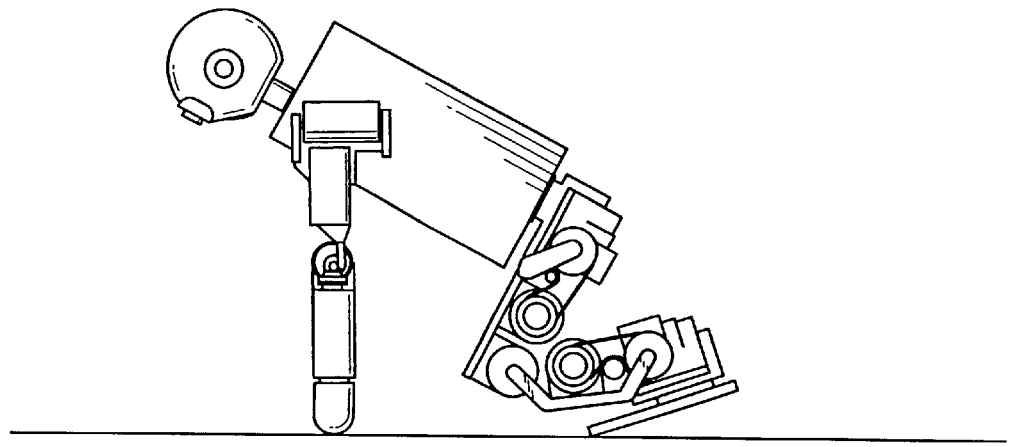
FIG. 40 illustrates the operation pattern for causing the legged mobile robot shown in FIG. 35 to get up from the "lying-on-the-face posture" when it has fallen down. More specifically.
Figure 41:
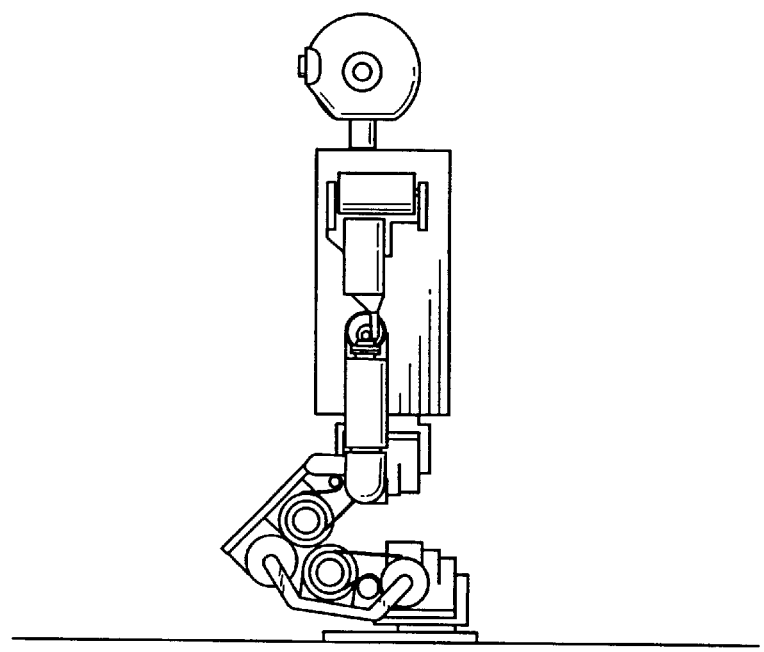
FIG. 41 illustrates the operation pattern for causing the legged mobile robot shown in FIG. 35 to get up from the "lying-on-the-face posture" when it has fallen down. More specifically.
Figure 42:
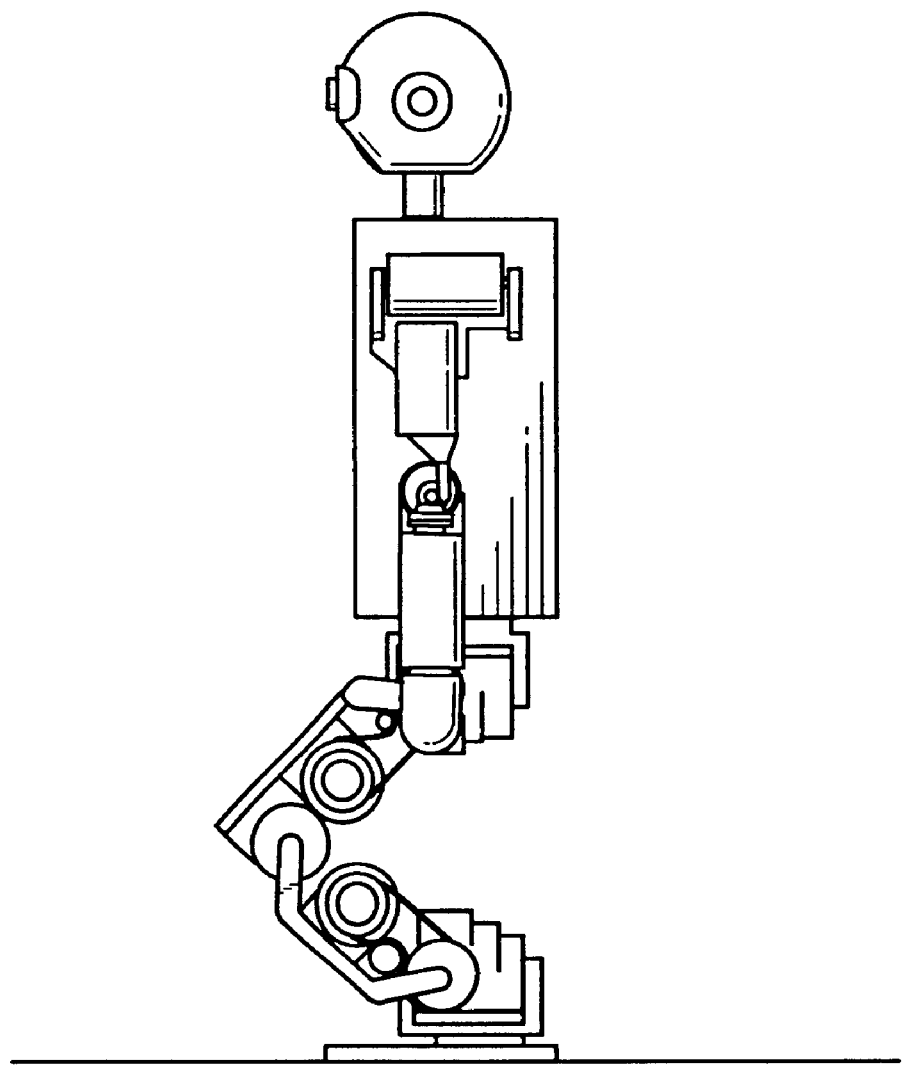
FIG. 42 illustrates the operation pattern for causing the legged mobile robot shown in FIG. 35 to get up from the "lying-on-the-face posture" when it has fallen down. More specifically.
Figure 43:
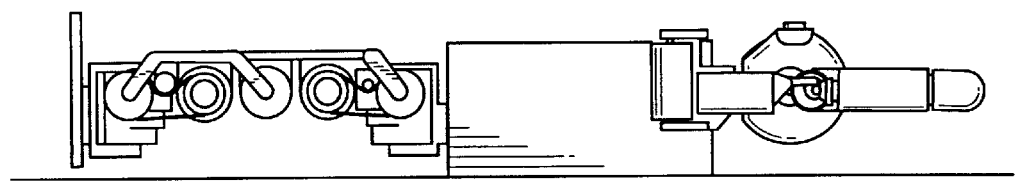
FIG. 43 illustrates a state in which the legged mobile robot shown in FIG. 35 is in the "lying-on-the-back posture" when it has fallen down (conventional example).
Figure 44:
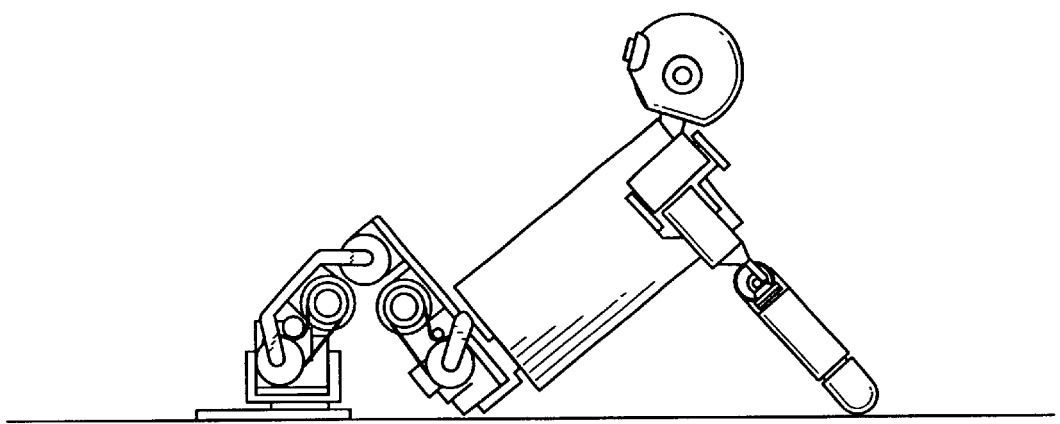
FIG. 44 illustrates an operation pattern for causing the legged mobile robot shown in FIG. 35 to get up from the "lying-on-the-back posture" when it has fallen down. More specifically.
Figure 45:
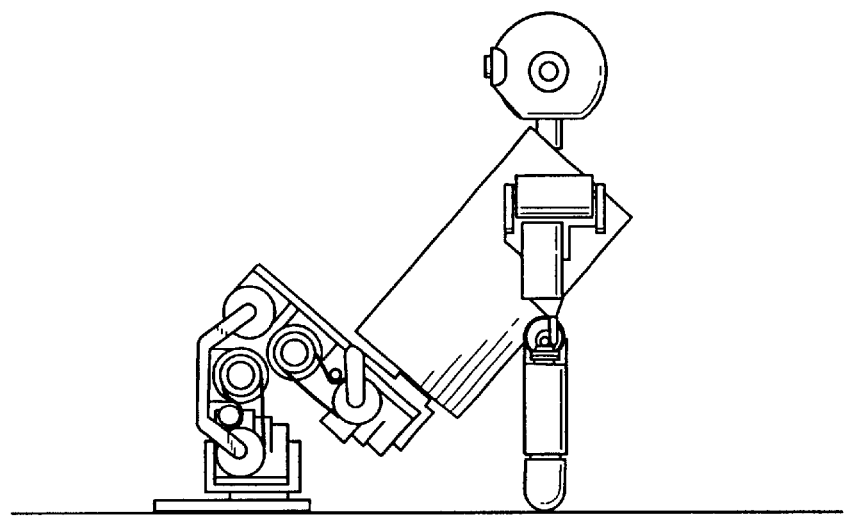
FIG. 45 illustrates the operation pattern for causing the legged mobile robot shown in FIG. 35 to get up from the "lying-on-the-back posture" when it has fallen down. More specifically.
Figure 46:
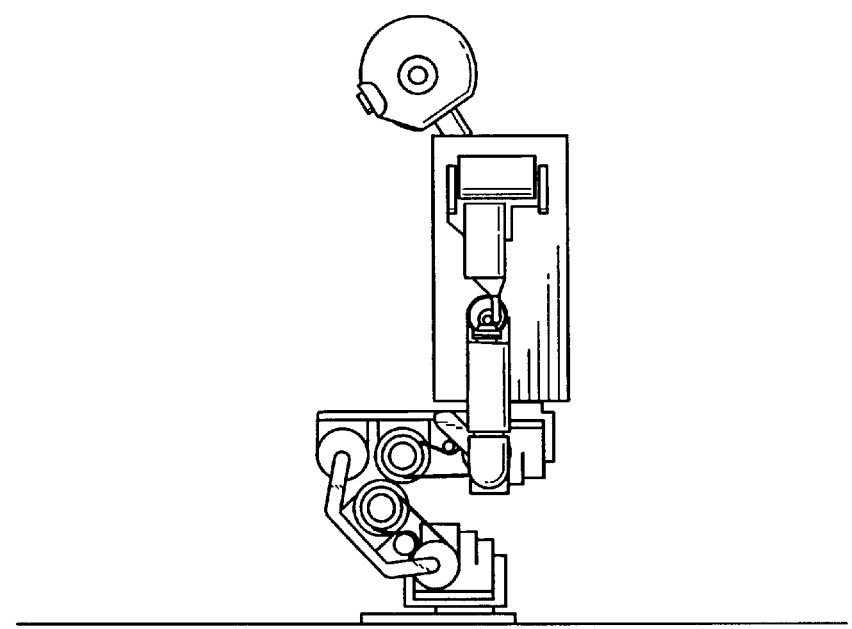
FIG. 46 illustrates the operation pattern for causing the legged mobile robot shown in FIG. 35 to get up from the "lying-on-the-back posture" when it has fallen down. More specifically.
Figure 47:
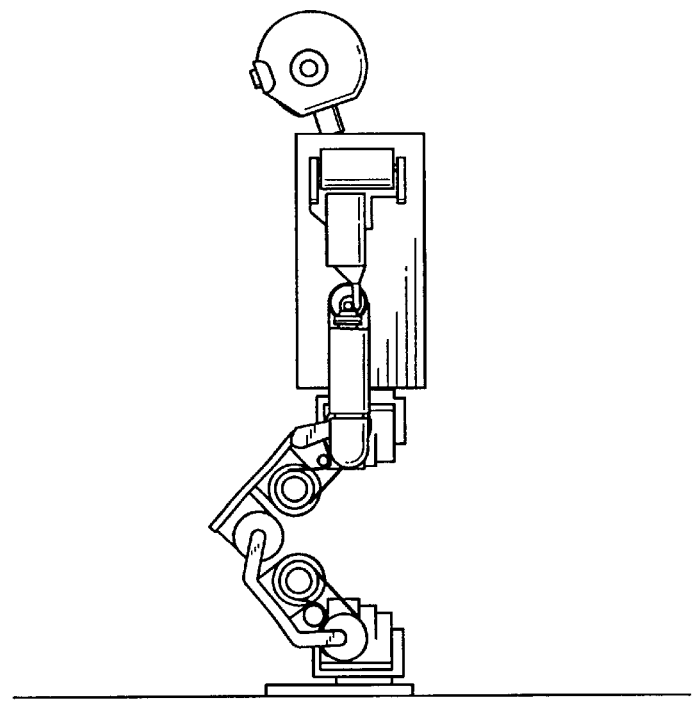
FIG. 47 illustrates the operation pattern for causing the legged mobile robot shown in FIG. 35 to get up from the "lying-on-the-back posture" when it has fallen down. More specifically.
Figure 48:
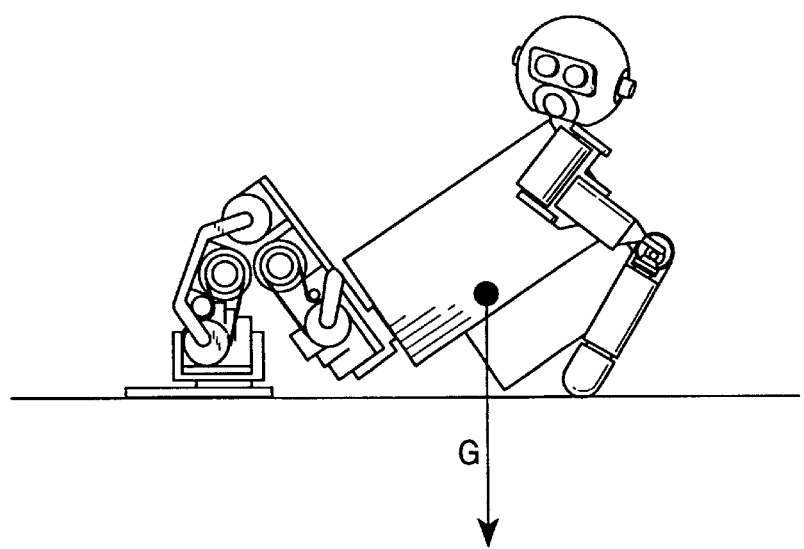
FIG. 48 illustrates a state in which the legged mobile robot becomes incapable of continuing moving while it is getting up from the "lying-on-the-back posture" (conventional example).

FIG. 34 shows a state in which the changing of the posture of the robot to the "lying sideways posture" is almost completed. By further rotating the trunk roll axis actuator $A_6$, the twisting movement can be facilitated, making it possible to more smoothly change the posture of the robot from the "lying sideways posture" to the "lying-on-the-face posture."

By supporting the operation pattern for changing the posture of the robot from the "lying-on-the-back posture" to the "lying sideways posture," and, then, from the "lying sideways posture" to the "lying-on-the face posture," the legged mobile robot 100 only needs to be able to perform a getting-up operation from the "lying-on-the-face posture" in order to independently get up from any fallen-down state.

By executing an operation pattern in an order opposite to that mentioned above so that the operations start with the state illustrated in FIG. 34 and ends with the state illustrated in FIG. 29, the posture of the robot can be changed from the "lying sideways state" shown in FIG. 21 to the "lying-on-the-back posture" shown in FIG. 29.

By repeatedly changing the postures from the "lying-on-the back state" to the "lying sideways state," and from the "lying sideways state" to the "lying-on-the-face state," the legged mobile robot 100 can move along the surface of the floor, that is, along a plane while it is in the fallen-down state. For example, if, by any chance, the robot moves into a place where there is an obstacle above the robot (or into a place where the ceiling is low) as a result of falling down, the robot can move to a place where there is no obstacle above it by moving in a plane while it is in a fallen-down state.

The present invention has been described in detail with reference to a particular embodiment of the present invention. However, it is obvious that modifications and substitutions may be made by those skilled in the art without departing from the gist of the present invention.

In the specification, typical examples of the getting-up operations which are executed when the legged mobile robot 100 which moves on two feet has fallen down have been described. However, the getting-up operation patterns are not limited to those illustrated in the appended drawings. It is to be understood that the getting-up operation pattern can be changed to a desirable one in accordance with the state and performance of the body of the robot, or the surrounding conditions/environment.

In short, the present invention has been described in various forms for illustrative purposes only. Therefore, it is to be understood that the present invention is not limited thereto. In order to determine the gist of the present invention, one should refer to the claims of the present invention.

In determining the gist of the present invention, it is not appropriate to strictly apply the term "joints" of the legged mobile robot 100 which walks on two feet in terms of those illustrated in FIG. 3, so that this term should be flexibly interpreted by comparison with the mechanism of the body of an actual animal which walks vertically on two feet such as a human being or a monkey.

Figure 49:
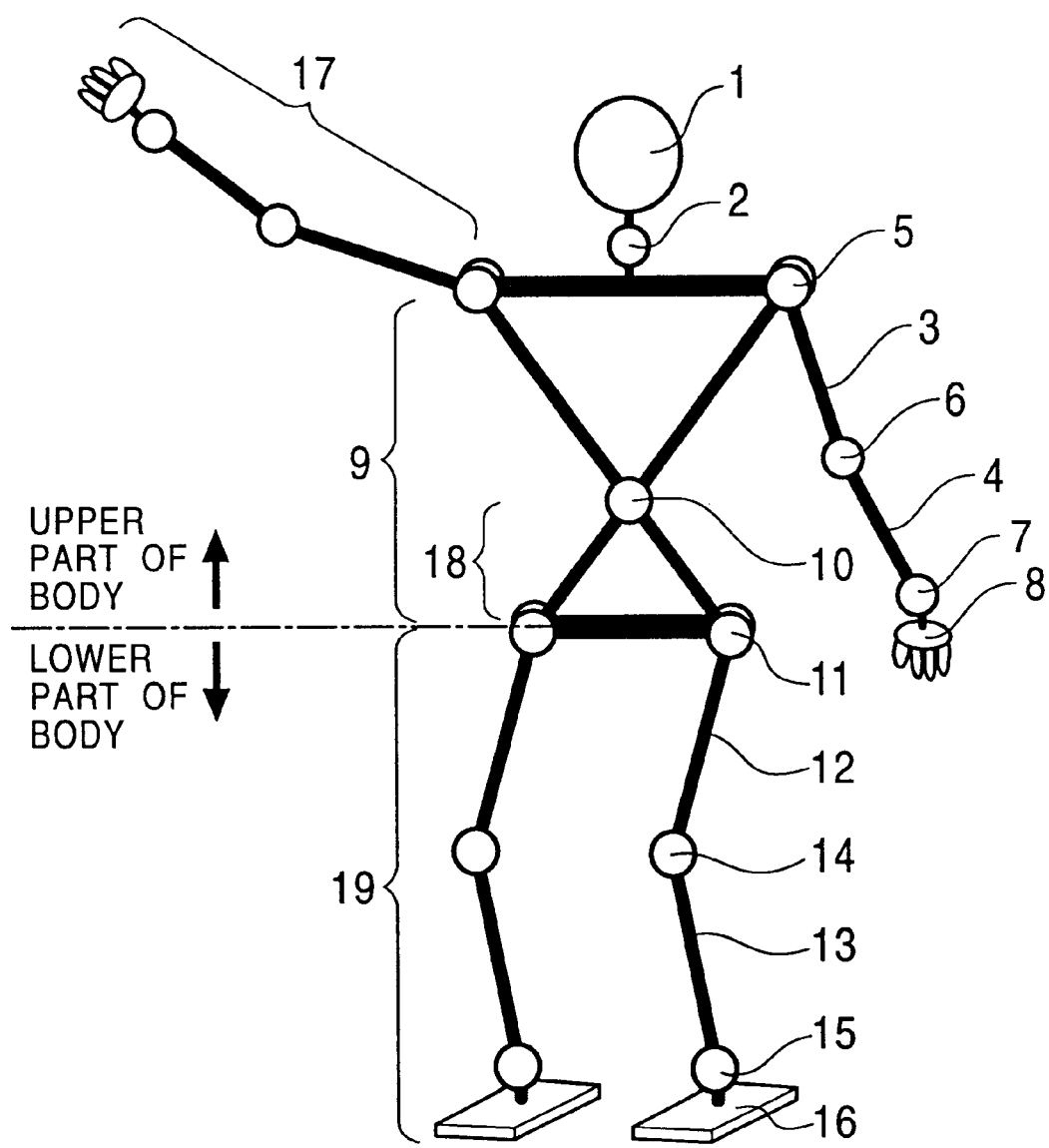
FIG. 49 is a schematic view of an example of a joint model structure of the legged mobile robot.

For reference, a joint model structure of a legged mobile robot is illustrated in FIG. 49. In the joint model structure shown in this figure, the sections of the robot from shoulder joints 5 to upper arms to elbow joints 6 to front arms, to wrists 7, and to hands 8 are called the upper limb sections. The section from the shoulder joints 5 to hip joints 11 is called the trunk, which corresponds to the trunk of a human being. The section of the trunk particularly from the hip joints 11 to trunk joints 10 is called the waist. The trunk joints 10 operate so as to provide the degrees of freedom provided by the backbone of a human being. The sections below the hip joints 11, including thighs 12, knee joints 14, lower thighs 13, ankles 15, and feet 16 are called the lower limb sections. In general, the part of the body above the hip joints is called the upper part of the body, whereas the part of the body below the hip joints is called the lower part of the body.

It is to be understood that the reference numerals used in FIG. 49 do not correspond to the reference numerals of the other figures, such as FIG. 5, used in the specification.

As can be understood from the foregoing description given in detail, according to the present invention, it is possible to provide an excellent legged mobile robot which can get up by itself when it has fallen down while it is, for example, walking or working, and the controlling mechanism thereof.

According to the present invention, it is possible to provide an excellent legged mobile robot which can independently get up when it lies in various fallen-down postures, and can automatically start working again after interruption of the work caused by the falling down of the robot, and the controlling mechanism thereof.

According to the present invention, it is possible to provide an excellent legged mobile robot which can reliably and smoothly get up independently from various fallen-down postures, such as the "lying-on-the-face posture," the "lying-on-the-back posture," and the "lying sideways posture," and the controlling mechanism thereof.

The present invention makes it possible to facilitate the restoring operation, that is, the getting-up operation from a fallen-down posture of the legged mobile robot. In addition, the required torque and load on the movable portions other that that of the trunk during the getting-up operation are reduced. Further, the load between each of the movable portions can be spread and averaged out, making it possible to prevent the load from concentrating on a particular portion. As a result, the robot is operated more reliably, and energy is used with greater efficiency during the getting-up operation.

According to the legged mobile robot of the present invention, by successively changing fallen-down postures from one fallen-down posture to another, an easier getting-up operation can be selectively executed.

According to the legged mobile robot of the present invention, by successively repeating a plurality of fallen-down postures, the robot can move in a plane without getting up. Therefore, the robot can get up after moving to a location where it can get up easily.

According to the legged mobile robot of the present invention, the fallen-down posture can be changed, so that it is possible to reduce the number and types of getting-up operation patterns which must be supported.

For example, when the robot previously provides getting-up operation patterns of the robot, the development period and development costs can be decreased as a result of decreasing the number of operation patterns. By reducing the number of operation patterns, the load on the hardware can be reduced, so that the system can be expected to improve correspondingly.

When the robot independently generates operation patterns in accordance with the condition of the robot, by reducing the number of operation patterns to be generated, the load on the computing unit which needs to be installed in the robot itself is reduced, making it possible to expect reduced device manufacturing costs and more reliable operations of the robot.

According to the legged mobile robot of the present invention, it is possible to limit the getting-up operation patterns by changing the fallen-down posture of the robot. As a result, for example, the operational range and output torque of each of the actuators required to make the robot get up are reduced. Therefore, the robot can be designed with greater freedom, and the development period and manufacturing costs can be reduced.

The methods which are performed to cause the robot to get up can be limited as a result of changing the fallen-down posture, so that, during the getting-up operation, it is possible to save consumption electrical power of the robot, and to reduce the load on the supply power such as a battery. Therefore, it is possible to increase the battery actuation time, and to perform continuous operations for a long time by one charging operation, as a result of which, for example, the robot working time,)working space, and working details are increased. In addition, since the required battery capacity is also reduced, the battery can be made smaller and lighter, so that the robot is designed with greater freedom. Further, since the number of specification requirements of the battery is reduced, the cost of the battery is reduced, making it possible to cut down operation and manufacturing expenses of the system as a whole.

What is claimed is:

1. A legged robot apparatus having a zero moment point (ZMP) comprising:

a trunk having a movable part and an actuator for driving the movable part;

a plurality of arms connected to the trunk;

a plurality of legs connected to the trunk; and wherein, the robot apparatus gets up from a fall-down posture on a floor by causing the zero moment point of the robot apparatus to move into the area where the legs contact the floor.

2. The robot apparatus according to claim 1, wherein the legs have feet and the area where the legs contact the floor is the area where the feet contact the floor.

3. The robot apparatus according to the claim 2, wherein the robot has at least two arms and two legs, each leg has a knee and each foot has a sole; and wherein, the robot apparatus makes the distance between its center of gravity G and the soles of the feet less than the lengths of the arms by bending the trunk and the legs to insert both knees between both arms in order to cause the ZMP to move into the area where the feet contact the floor.

4. The robot apparatus according to the claim 1, wherein the movable part has a pitch axis and the actuator is a pitch axis actuator.

5. A legged robot apparatus having a zero moment point (ZMP) comprising:

a trunk having a movable part and an actuator for driving the movable part;

a waist connected to the trunk;

a plurality of arms connected to the trunk;

a plurality of legs connected to the waist; and wherein, the robot gets up from a supine position on a floor by moving to a posture where the waist is in contact with the floor, and the robot apparatus makes the distance between points of the arms which contact the floor and points of the legs which contact the floor shorter in order to cause the ZMP to move into the area where the legs contact the floor.

* * * * *